(12) United States Patent
Han et al.

(10) Patent No.: US 7,865,019 B2
(45) Date of Patent: Jan. 4, 2011

(54) ON OPTIMIZING TEMPLATE MATCHING VIA PERFORMANCE CHARACTERIZATION

(75) Inventors: Tony X. Han, Urbana, IL (US); Visvanathan Ramesh, Plainsboro, NJ (US); Ying Zhu, Monmouth Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 1041 days.

(21) Appl. No.: 11/493,311

(22) Filed: Jul. 26, 2006

(65) Prior Publication Data

US 2007/0025594 A1     Feb. 1, 2007

Related U.S. Application Data

(60) Provisional application No. 60/702,748, filed on Jul. 27, 2005.

(51) Int. Cl.
    *G06K 9/62*        (2006.01)

(52) U.S. Cl. ...................................................... 382/209
(58) Field of Classification Search .................... None
See application file for complete search history.

(56) References Cited

U.S. PATENT DOCUMENTS 5,444,489 A * 8/1995 Truong et al. .......... 375/240.22
6,765,965 B1 * 7/2004 Hanami et al. ......... 375/240.16

* cited by examiner

*Primary Examiner*—Samir A. Ahmed
*Assistant Examiner*—Fred Hu
(74) *Attorney, Agent, or Firm*—Donald B. Paschburg

(57) ABSTRACT

The performance of template matching is characterized by deriving the distribution of warp parameter estimate as a function of the ideal template, the ideal warp parameters and a given perturbation or noise model. An expression for the Probability Mass Function of the parameter estimate is provided. The optimal template size for template matching is the one that provides the best matching performance which is calculated from the minimum entropy of the parameter estimate.

20 Claims, 18 Drawing Sheets

ON OPTIMIZING TEMPLATE MATCHING VIA PERFORMANCE CHARACTERIZATION

CROSS-REFERENCE TO RELATED APPLICATIONS

This application claims the benefit of U.S. Provisional Application No. 60/702,748, filed Jul. 27, 2005, which is incorporated herein by reference.

BACKGROUND OF THE INVENTION

The present invention relates to image processing in computer vision. More specifically it relates to template matching in computer vision.

Template matching is a fundamental operator in computer vision and is widely used in feature tracking, motion estimation, image alignment, and mosaicing. Under a certain parameterized warping model, the traditional template matching algorithm estimates the geometric warp parameters that minimize the SSD (sum of square of differences) between the target and a warped template.

The performance of the template matching can be characterized by deriving the distribution of warp parameter estimate as a function of the ideal template, the ideal warp parameters, and a given noise or perturbation model.

The performance of template matching depends on the choice or block size of the template. Accordingly methods to optimize the choice or block size of the template are required.

SUMMARY OF THE INVENTION

One aspect of the present invention provides a method for predictive characterization of the performance of a template matching technique for object tracking and uses a predictive performance model to compute the optimal size of templates for robust object tracking.

It is another aspect of the present invention to provide a method for tracking by template matching a data object in a first data frame to a sequential second data frame comprising the steps of extracting landmark features from the first data frame into a template of a first size; estimating additive white Gaussian noise (AWGN) distribution in the first data frame; utilizing prior knowledge of the range of warp parameters between a given template in the first image and potential matching regions of the second image to compute a predictive performance model, i.e. probability distribution of warp parameter estimate that is a function of the template size; selecting the template size that minimizes the entropy of the predictive probability distribution; using the template size chosen to perform template matching against potential match regions (specified by the prior knowledge of the range of warp parameters) and estimating the best warp parameter that matches the chosen template to a region in the second image.

It is a further aspect of the present invention to provide a method for tracking a data object by template matching wherein the warping parameters are bijection warping parameters.

It is another aspect of the present invention to provide a method for tracking a data object by template matching, wherein the predictive performance model for the estimate of the warping parameters is one of a set of warping parameters with a Probability Mass Function.

It is a further aspect of the present invention to provide a method for tracking a data object by template matching wherein the Probability Mass Function depends on the AWGN distribution in the first and second data frame.

It is another aspect of the present invention to provide a method for tracking a data object by template matching wherein the Probability Mass Function of the estimate can be approximated as $$Pr[\alpha^{(j)}] \approx Q[\alpha^{(j)}] = K \prod_{\substack{i=1 \\ i \neq j}}^{M} Pr[Y_{ij} < 0]$$

$$= K \prod_{\substack{i=1 \\ i \neq j}}^{M} \Phi\left(\frac{-E[Y_{ij}]}{\sqrt{\text{Var}[Y_{ij}]}}\right).$$

It is a further aspect of the present invention to provide a method for tracking a data object by template matching wherein the first data frame and the second data frame are image data.

It is another aspect of the present invention to provide a method for tracking a data object by template matching wherein the size of the template is optimal when the entropy of the Probability Mass Function of the estimate is minimal.

It is a further aspect of the present invention to provide a method for tracking a data object by template matching over more than 2 sequential data frames by optimally tracking the object between all two sequential data frames.

A system that can process data frames for tracking an object by template matching, comprising a processor and application software operable on the processor is also provided in accordance with one aspect of the present invention. The application software can perform all of the methods described herein.

DESCRIPTION OF A PREFERRED EMBODIMENT

Figure 1:
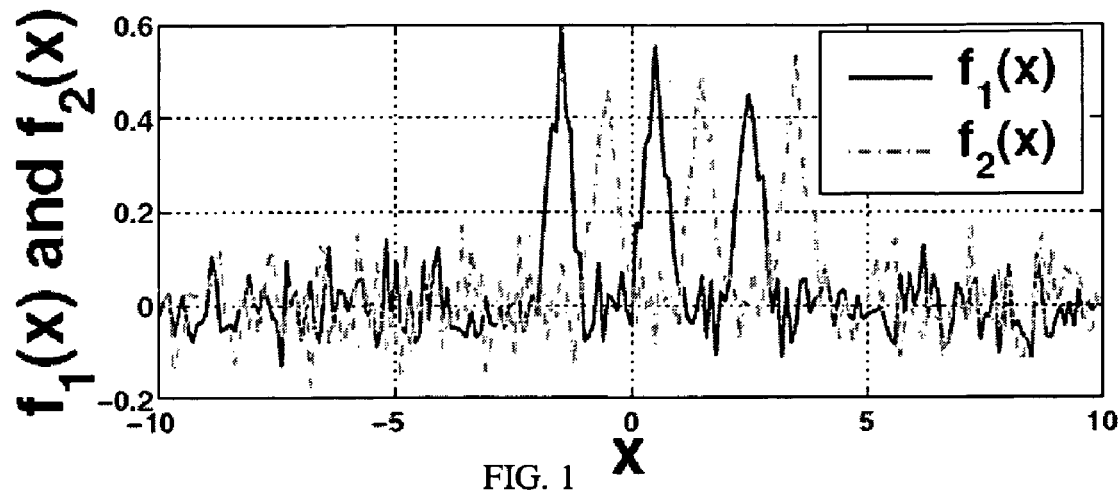
FIG. 1 provides 2 frames of a 1d signal.

Template/Block matching methods and its variations have been widely used in tasks such as visual tracking as described in: M. J. Black and A. D. Jepson, "Eigentracking: Robust matching and tracking of articulated objects using a view-based representation," *IJCV*, vol. 26, pp. 63-84, 1998; A. Jepson, D. Fleet, and T. El-Maraghi, "Robust online appearance models for visual tracking," *IEEE Trans. on PAMI*, vol. 25, pp. 1296-1311, October 2003; H. Tao and T. Huang, "Explanation-based facial motion tracking using a piecewise Bezier volume deformation model," in *CVPR*, pp. 611-617, 1999. It is used in video coding as described in: H. Musmann, P. Pirsch, and H.-J. Grallert, "Advances in picture coding," *Proc. IEEE*, vol. 73, pp. 523-548, April 1985, in layered motion estimation as described in J. R. Bergen, P. Anandan, K. J. Hanna, and R. Hingorani, "Hierarchical model-based motion estimation," in *ECCV*, pp. 237-252, Springer-Verlag, 1992, in image alignment as described in B. Lucas and T. Kanade, "An iterative image registration technique with an application to stereo vision," IJCAI, pp. 6779, 1981, and also in 3D reconstruction as described in C. Tomasi and T. Kanade, "Shape and motion from image streams under orthography: a factorization method," *IJCV*, vol. 9, no. 2, pp. 137-154, 1992 and J. P. Costeira and T. Kanade, "A multibody factorization method for independently moving objects," *IJCV*, vol. 29, pp. 159-179, 1998. It is also applied in medical imaging as described in D. Comaniciu, X. Zhou, and A. Krishnan, "Robust real-time myocardial border tracking for echocardiography: an information fusion approach," *IEEE Trans. on Medical Imaging*, pp. 849-860, 2004, and in image mosaicing as described in H. Y. Shum and R. Szeliski, "Construction and refinement of panoramic mosaics with global and local alignment," in *JCCV*, p. 953, IEEE Computer Society, 1998. By assuming a parameterized warping model, the traditional template matching algorithm determines the optimal warping parameter that minimizes the SSD (sum of square of differences) between the target and the warped template. These methods tackle template matching as an optimization problem and solve it by various hill climbing methods such as gradient descent, Newton, Gauss-Newton, steepest descent and Levenberg-Marquardt. Practical application of template matching requires the selection of appropriate scales and/or features for which the matching can happen reliably. This is typically done through the use of a multi-scale approach and/or choice of textured features with minimal tracking errors. For instance, in Shi and Tomasi's widely influential work J. Shi and C. Tomasi, "Good features to track," *Proc. CVPR*, pp. 593-600, 1994, they discuss template matching under affine warping assumption. Dissimilarity, measured as the SSD between back warped target and template, is used to evaluate the matching performance. Image patches with sufficient texture produce reliable solution and thus are treated as a good feature. More recently, Kaneko and Hon in T. Kaneko and 0. Hori, "Feature selection for reliable tracking using template matching," in *CVPRO3*, pp. 796-802, 2003, provide an upper bound of average matching error for translation and suggest the use of features that have a small upper bound.

A number of papers have been published on evaluation of motion estimation algorithms. Most of them have been in the context of study and influence of errors in motion estimation on Structure-from-Motion. Fermuller and Aloimonos in C. Fermuller, D. Shulman, and Y. Aloimonos, "The statistics of optical flow," *CVIU*, vol. 82, pp. 1-32, April 2001, study the bias and variance in flow estimation and relate it to explain many of the illusions that are perceived by the human visual system. Aguiar and Moura in P. Aguiar and J. Moura, "Image motion estimation: Convergence and error analysis," in *JCIPO*, pp. 11:937-940, 2001, study the stability of motion estimates as a function of the brightness pattern in the image and show the relationship between the image gradient magnitudes and the stability/convergence of the motion estimation algorithm. Both these papers study how the bias and covariance of estimated parameters relate to the image measurements and therefore can be viewed as studying Gaussian approximations to the error statistics of the motion estimate.

One aspect of the present invention relates to articulating the distribution of the estimated motion/warping parameters as a function of the image brightness values, noise parameter, and true warping parameter. The parameterized warping model in the framework of the present invention can be any one-to-one warping (bijection). The warping parameter estimate is treated as one of possible sets of warping parameters with a probability mass function (PMF). The PMF of the warp estimate is derived as a function of the ideal image brightness values, the noise model parameters, and the true warp parameters. In a given block/template matching problem, this PMF is also a function of the size of the block/template used. The entropy of the estimate PMF is a measure of uncertainty of the estimate. This fact is used as one aspect of the present invention to choose the block/template size that provides the minimum entropy across the range of choices for the size parameter.

One aspect of the present invention is providing a complete probabilistic characterization for template matching under any bijection warping model. Unlike past work where typically a Gaussian approximation is used for modeling the error distribution for geometric warp parameters (i.e. translation, affine parameter estimates for example), in the present invention a complete distribution of the estimate is derived, wherein the analysis applies the assumption of discretization of the warp parameter space. A difference with other papers is the explicit modeling of underlying correlation between evaluated SSD scores for each target versus image template comparison. To enable faster computation of the PMF an approximation is provided that exploits this correlation structure of the random variables involved in the estimation algorithm. The entropy of the estimate's PMF is used as a measure to decide the right scale at which the template matching should be performed. The present invention is validated on simulated examples and its application to feature tracking in a face video is shown to illustrate its robustness.

Suppose $f_1(x)$ and $f_2(x)$ are two frames of an observed image in the input image sequence, where $x=(x_1,\ldots,x_d)^T \in R^d$. If $d=2$, $f_1(x)$ and $f_2(x)$ are 2D images. When $d=3$, $f_1(x)$ and $f_2(x)$ are volumetric images with voxel $x \in R^3$.

The template or image patch that needs to be matched between frames is denoted as $g(x)$ for $x \in \Omega$. Here $\Omega = \{x \in R^d:$ The pixel x lies inside the template} and the size of the template is W=|Q|, i.e. the cardinality of Ω. It is assumed that the template is contained in a "clean" image, $f(x)$, defined as:

$$f(x) = \begin{cases} g(x) & x \in \Omega, \\ 0 & \text{otherwise.} \end{cases}$$

By modeling the background clutter, illumination, and the camera noise as the AWGN, the first frame of the observed image sequence is:

$$f_1(x)=f(x)+\eta(x), \quad (1)$$

where $\eta(x)$ is the zero mean Gaussian random variable with the variance denoted as $\sigma^2$. The $\eta(x)$s are independent to each other, i.e.

$$\text{Cov}[\eta(x_1), \eta(x_2)] = \begin{cases} \sigma^2 & x_1 = x_2 \in R^d, \\ 0 & \text{otherwise.} \end{cases}$$

It is assumed that the parameterized template warping model between two images is a bijection $\tilde{\alpha}: R^d \to R^d$. If the warping model is pure translation, then $\tilde{\alpha}(x)=x+t$. Here $t \in R^d$ is the translation vector. If the template undergoes affine warping, this will provide $\tilde{\alpha}(x)=\tilde{A}x+\tilde{b}$, where $\tilde{A} \in GL(d, R)$ and $\tilde{b} \in R^d$. Here GL(d,R) denotes the real general linear group on $R^d$. So the second frame observed is:

$$f_2(x)=f(\tilde{\alpha}(x))+\xi(x). \quad (2)$$

Here $\xi(x)$ is the AWGN in the second frame of the image. It is assumed that the noise is stationary and uncorrelated to each other among frames. Thus $\xi(x)$ has exactly the same distribution as $\eta(x)$ and their cross correlation:

$$E[\eta(x_1)\xi(x_2)]=0$$

for $x_1, x_2 \in R^d$. For convenience, the notation of ã will be slightly adjusted. It will be used to represent both the "template warping model" and the "parameters" of the model. This should cause no confusion because the meaning of $\tilde{\alpha}$ is clear within context.

Given $f_1(x)$ and $f_2(x)$, the traditional template matching is to estimate the parameters of the template warping model $\tilde{\alpha}$ minimizing SSD between warped template and target. In the framework of the present invention, the purpose is to estimate the $\tilde{\alpha}$ with the highest matching probability. Preliminary definitions for this formulation will be provided. And the definition of the matching probability will be given accordingly. From equations (1) and (2), one can derive $$f(x)=f_1(x)-\eta(x) \quad (3)$$

$$f(\tilde{\alpha}(x))=f_2(x)-\xi(x) \quad (4)$$

Suppose one possible estimate of $\tilde{\alpha}$ is $\alpha$. The "clean" image in the second frame, $f(\tilde{\alpha}(x))$, can be rectified by warping it back using $\alpha^{-1}$, i.e. $f(\tilde{\alpha}\alpha^{-1}(x))=f_2(\alpha^{-1}(x))-\xi(\alpha^{-1}(x))$. If the estimate is good, the rectified "clean" image $f(\tilde{\alpha}\alpha^{-1}(x))$ is close to the original "clean" image $f(x)$. Ideally, if $\alpha=\tilde{\alpha}$ the rectified version is the same as the "clean" image in the first frame, i.e. $f(\tilde{\alpha}\alpha^{-1}(x))=f(x)$. The similarity between $f(x)$ and $f(\tilde{\alpha}\alpha^{-1}(x))$ indicates the goodness of the estimation. Therefore the square of the $l_2$ distance between the "clean" image $f(x)$ and its rectified version, $f(\tilde{\alpha}\alpha^{-1}(x))$, is defined as a function depending on $\alpha$:

$$d(\alpha) = \sum_{x \in \Omega} (f(x) - f(\tilde{\alpha}\alpha^{-1}(x)))^2 \quad (5)$$

$$= \sum_{x \in \Omega} ((f_1(x) - \eta(x)) - (f_2(\alpha^{-1}(x)) - \xi(\alpha^{-1}(x))))^2$$

Here $\alpha$ can be all possible parameterized warping of the image patch between two frames. If $\alpha=\tilde{\alpha}$, $d(\alpha)=0$. One should notice that since only access to $f_1(x)$ and $f_2(\alpha^{-1}(x))$ exists, $d(\alpha)$ is a random variable. It is different from SSD since the SSD is a determined number. It is noted that the set of all possible warping parameters that $\alpha$ can take as $A=\{\alpha^{(j)}\}$, where j=1, ..., A. Here A=|A|.

The matching probability of "the true warping parameters $\tilde{\alpha}=\alpha^{(j)}$" is Pr $[\alpha^{(j)}]$. From equation (5), one has $d(\tilde{\alpha})=0 \leq d(\alpha)$. This means the event "the true warping parameters $\tilde{\alpha}=\alpha^{(j)}$" is equivalent to the event "$d(\alpha^{(j)}) < d(\alpha^{(i)})$ for $\forall i \neq j$". Thus the matching probability Pr $[\alpha^{(j)}]$ is computed as:

$$Pr[\tilde{\alpha} = \alpha^{(j)}] \equiv Pr[\alpha^{(j)}] = Pr\left[\bigcap_{\substack{i=1 \\ i \neq j}}^{A} (d(\alpha^{(j)}) < d(\alpha^{(i)}))\right] \quad (6)$$

The matching probability $Pr[\alpha^{(j)}]$ is determined by not only the similarity between the template and the warped-back target under warping $\alpha^{(j)}$, but also their dissimilarity under other possible warpings.

Therefore the template matching result, i.e. the estimation of the warping parameters $\tilde{\alpha}$ is:

$$\alpha = \underset{\alpha^{(j)}}{\text{argmax}} Pr[\alpha^{(j)}], \quad (7)$$

where j=1 ... A. Since $\eta(x)$ and $\xi(x)$ are IID Gaussian random variables, $d(\alpha)$ is a random variable distributed as $$\chi'^2\left(W, \sum_{x \in \Omega} (f_1(x) - f_2(x))^2\right)$$

(non-central Chi-squared distribution with W=|Ω| degrees of freedom). In order to estimate the warping parameters, equation (6) needs to be evaluated to determine the $\alpha^{(j)}$ with the highest matching probability. However, it is extremely hard to evaluate equation (6) when $d(\alpha)$'s are non-central Chi-squared distributed and are dependent on each other. Also, as the cardinality of A, A is usually very large (>100). This makes the evaluation problem even more difficult due to the curse of dimensionality. By noticing that the non-centrality parameter $$\lambda = \sum_{x \in \Omega} (f_1(x) - f_2(\alpha^{-1}(x)))^2$$

is usually large enough, the joint distribution of d(α)'s can be approximated as a multivariate Gaussian with the uniformal approximation error $O(\lambda^{-1/2})$ (referring to page 466 of [15] N. Johnson, S. Kotz, and N. Balakrishnan, *Continuous Univariate Distributions*, vol. II. New York, USA: John Wiley & Sons, 1995).

Let $D_\alpha = (d(\alpha^{(1)}), d(\alpha^{(2)}), \ldots, d(\alpha^{(A)}))^T$, and $D_\alpha$ is approximated as $$G_\alpha \propto N\left(\mu_\alpha, \sum_\alpha\right)$$

that $\mu_\alpha = E[D_\alpha]$ and $$\sum_\alpha = \text{Cov}[D_\alpha].$$

For $\forall \alpha \in A$, i.e. for all possible warpings, the expectation, variance, and covariance of d(α) can be computed as:

$$E[d(\alpha)] = 2W\sigma^2 + \sum_{x \in \Omega} (f_1(x) - f_2(\alpha^{-1}(x)))^2 \quad (8)$$

$$\text{Var}[d(\alpha)] = 8W\sigma^4 + 8\sigma^2 \sum_{x \in \Omega} (f_1(x) - f_2(\alpha^{-1}(x)))^2 \quad (9)$$

When $\alpha \neq \beta$ and $\alpha, \beta \in A$ $$\text{Cov}[d(\alpha), d(\beta)] = 2W\sigma^4 + 2|\Omega_\alpha \cap \Omega_\beta|\sigma^4 + \quad (10)$$
$$4\sigma^2 \sum_{x \in \Omega} (f_1(x) - f_2(\alpha^{-1}(x)))(f_1(x) - f_2(\beta^{-1}(x))) +$$
$$4\sigma^2 \sum_{x \in \Omega_\alpha \cap \Omega_\beta} (f_1(\alpha(x)) - f_2(x))(f_1(\beta(x)) - f_2(x))$$

where the α-warping set of Ω is defined as $\Omega_\alpha \equiv \{x \in R^d : \alpha^{-1}(x) \in \Omega, \alpha \in A\}$. Similarly $\Omega_\beta \equiv \{x \in R^d : \beta^{-1}(x) \in \Omega, \beta \in A\}$. The derivation of equations (8), (9), and (10) can be found at the end of this specification.

Through equations (8), (9) and (10), the Gaussian random vector $G_\alpha$ can be fit to $D_\alpha$ by granting $G_\alpha$ the same mean and covariance matrix as $D_\alpha$. For small A (A<10), equation (6) can be computed according to equation (36) at page 51 of [16] N. Johnson and S. Kotz, *Distributions in statistics: Continuous Multivariate Distributions*. New York, USA: John Wiley & Sons, 1972. But usually A>>10. There are three possible methods to evaluate equation (6): Method 1: Dimension reduction. Method 2: Sampling based method. One can approximate $G_\alpha$ by a low dimensional Gaussian random vector $G_L$ (L<<A) by eigen-decomposition of the covariance $$\sum_\alpha.$$

Unfortunately, since A is very big (>100), simple dimension reduction by projection to low dimension space won't have a good approximation. The sampling based methods use Monte Carlo techniques to evaluate equation (6). However, sampling methods are infeasible when A is large. Method 3: Factorization based method. Due to the limitations of the previous two approaches, a further assumption will be added to make the evaluation of equation (6) more tractable. The assumption, enlightened by the Naive Bayesian method as described in [17] T. Mitchell, *Machine Learning*. McGraw Hill, 1997, is that the matching probability in equation (6) can be pairwise factorized as $$Pr[\alpha^{(j)}] = Pr\left[\bigcap_{\substack{i=1 \\ i \neq j}}^{A} (d(\alpha^{(j)}) < d(\alpha^{(i)}))\right] \quad (11)$$
$$\approx K \prod_{\substack{i=1 \\ i \neq j}}^{A} Pr[d(\alpha^{(j)}) < d(\alpha^{(i)})] \equiv Q[\alpha^{(j)}]$$

where K is a normalizing constant to ensure $$\sum_j Pr[\alpha^{(j)}] = 1.$$

One can easily compute this probability by knowing the expectation and covariance of d(α)'s computed from equations (8), (9), and (10).

Let the random variable $\tilde{Y}_{ij} = d(\alpha^{(j)}) - d(\alpha^{(i)})$. $\tilde{Y}_{ij}$ is the difference of two dependent non-central Chi-squared random variable. A Gaussian random variable $Y_{ij}$ will be used to approximate $\tilde{Y}_{ij}$ such that $E[Y_{ij}] = E[\tilde{Y}_{ij}]$ and $\text{Var}[Y_{ij}] = \text{Var}[\tilde{Y}_{ij}]$. Therefore one has $$E[Y_{ij}] = E[d(\alpha^{(j)})] - E[d(\alpha^{(i)})]$$
$$\text{Var}[Y_{ij}] = E\left[(d(\alpha^{(j)}) - d(\alpha^{(i)}) - E[d(\alpha^{(j)})] + E[d(\alpha^{(i)})])^2\right]$$
$$= \text{Var}[d(\alpha^{(j)})] + \text{Var}[d(\alpha^{(i)})] - \text{Cov}[d(\alpha^{(j)}), d(\alpha^{(i)})]$$

Finally the matching probability in equation (6) is approximated as:

$$Pr[\alpha^{(j)}] \approx Q[\alpha^{(j)}] = K \prod_{\substack{i=1 \\ i \neq j}}^{M} Pr[Y_{ij} < 0] \quad (12)$$
$$= K \prod_{\substack{i=1 \\ i \neq j}}^{M} \Phi\left(\frac{-E[Y_{ij}]}{\sqrt{\text{Var}[Y_{ij}]}}\right).$$

Here $\Phi(x)$ is the Cumulative Distribution Function (CDF) of $N(0,1)$.

In order to apply the above template matching algorithm to the 2D (image) or 3D data (volumetric image), a reasonable run-time is required for the algorithm. Thus the factorization approach is a good computable implementation of the present formulation. Experimental results that will be provided in a later segment as part of the present invention will show that the approximation is reasonable and facilitates the evaluation of equation (6) significantly. A Matlab implementation for approach Method 3 runs 0.04 second for 1d signal in an PIII 1.1 GHz laptop. An implementation in C++ code runs more than 100 times faster.

Monte Carlo Simulation to Validate the Factorizable Assumption

To validate the assumption that the matching probability $Pr[\alpha^{(j)}]$ can be approximated as $Q[\alpha^{(j)}]$ defined in equation (11) by pairwise factorization, Monte Carlo simulations will be performed and the similarity between $Pr[\alpha^{(j)}]$ and $Q[\alpha^{(j)}]$ will be measured. The Bhattacharyya coefficient will be used to measure the similarity of two distributions. For a discrete random variable, the Bhattacharyya coefficient between the two probability mass function (PMF) is defined as $$\rho \equiv \sum_{j=1}^{M} \sqrt{Pr[\alpha^{(j)}]Q[\alpha^{(j)}]}.$$

Figure 2:
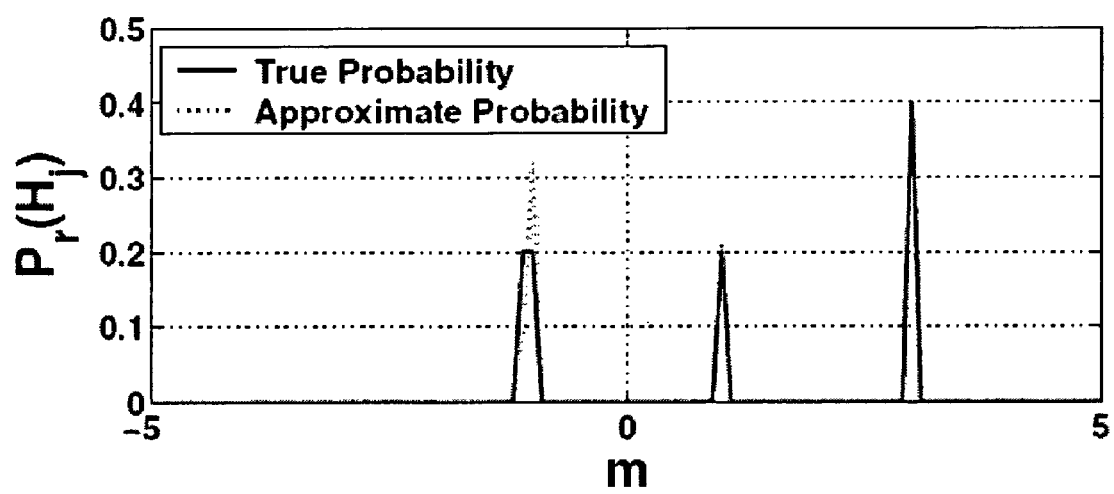
FIG. 2 provides a graph of a joint pmf and its approximation.
Figure 3:
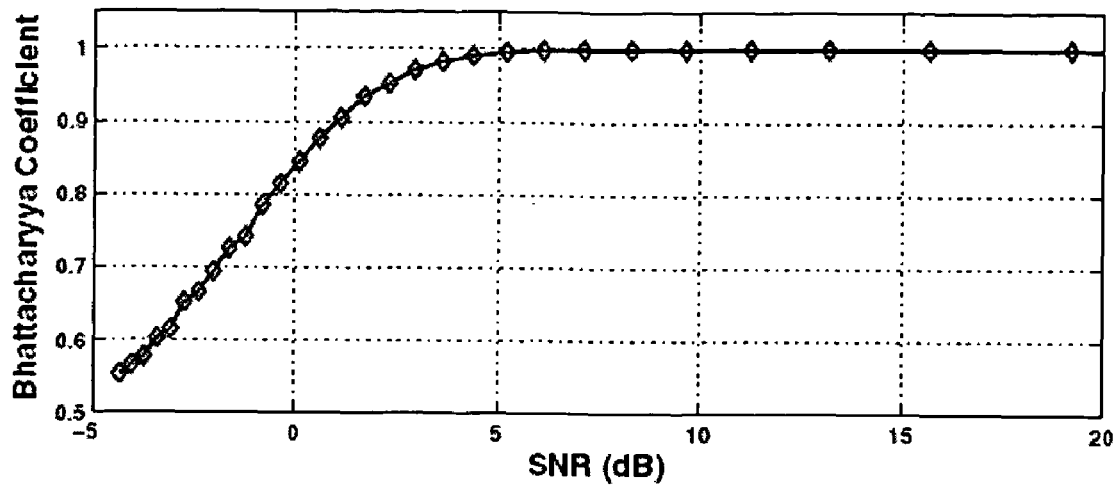
FIG. 3 provides a graph of the similarity of two distributions.

Therefore $0 \leq \rho \leq 1$ and the closeness of $\rho$ to 1 reflects the similarity between the two PMFs. Particularly, when the two PMFs are identical, $\rho=1$. Monte Carlo simulations for various kinds of 1d signal such as rectangular wave, triangle pulse, sinusoidal signal, circular wave, etc., will be run 10000 times under different SNR conditions, wherein SNR$\equiv$20 $\log_{10}(E|f(x)/\eta(x)|)$ in units of dB. FIG. 1 and FIG. 2 show 1 simulation for a three pulse triangle wave with SNR=5.4921 db. It can be seen that $Pr[\alpha^{(j)}]$ and $Q[\alpha^{(j)}]$ shown in FIG. 2 are very close. Their Bhattacharyya coefficient is 0.9817. The average Bhattacharyya coefficient over all signals with a different SNR is shown in FIG. 3. The two PMFs are very close when the SNR is above 2 db and are identical when SNR is above 6 db. This simulations show that the applied approximation which is one aspect of the present invention, is very good for SNR larger than 2 db. From this experience it appears that template matching is almost impractical when the SNR is lower than 2 db.

Data-Driven Template Selection

For template matching, an important question that needs to be answered is "How to choose a template that produces reliable matching results?" Suppose many available templates are available which contain the image content that needs to be matched. A criterion is needed to select the best template which gives the most reliable matching result. Denote the family of all available templates containing the content of interest as $T=\{\Omega_k\}$, where $k=1, \ldots, T$ and $T=|T|$. Here $\Omega_k$ is an image patch and a template candidate. For each template $\Omega_k$, the distribution of the warp parameter estimate can be computed by equation (11). When $\Omega_k$ is used as template to match, the matching probability $Pr[\alpha^{(j)}]$ for warping parameters $\alpha^{(j)}$ is denoted as $p_k^{(j)}$. For template $\Omega_k$, its entropy of the estimate is defined as $$H(\Omega_k) = -\sum_{j=1}^{A} p_k^{(j)} \log(p_k^{(j)}) \quad (13)$$

Thus the optimal template $\hat{Q}$ which gives the least entropy of the estimate i.e. the least matching ambiguity can be selected as:

$$\Omega = \underset{\Omega_k}{\operatorname{argmin}} H(\Omega_k), \quad (14)$$

where $k=1, \ldots, T$. By finding the template that minimizes the entropy of the estimate, the data driven template selection is achieved. The optimal template chosen by this criterion gives the matching result with least ambiguity.

Experiment Results

Figure 4:
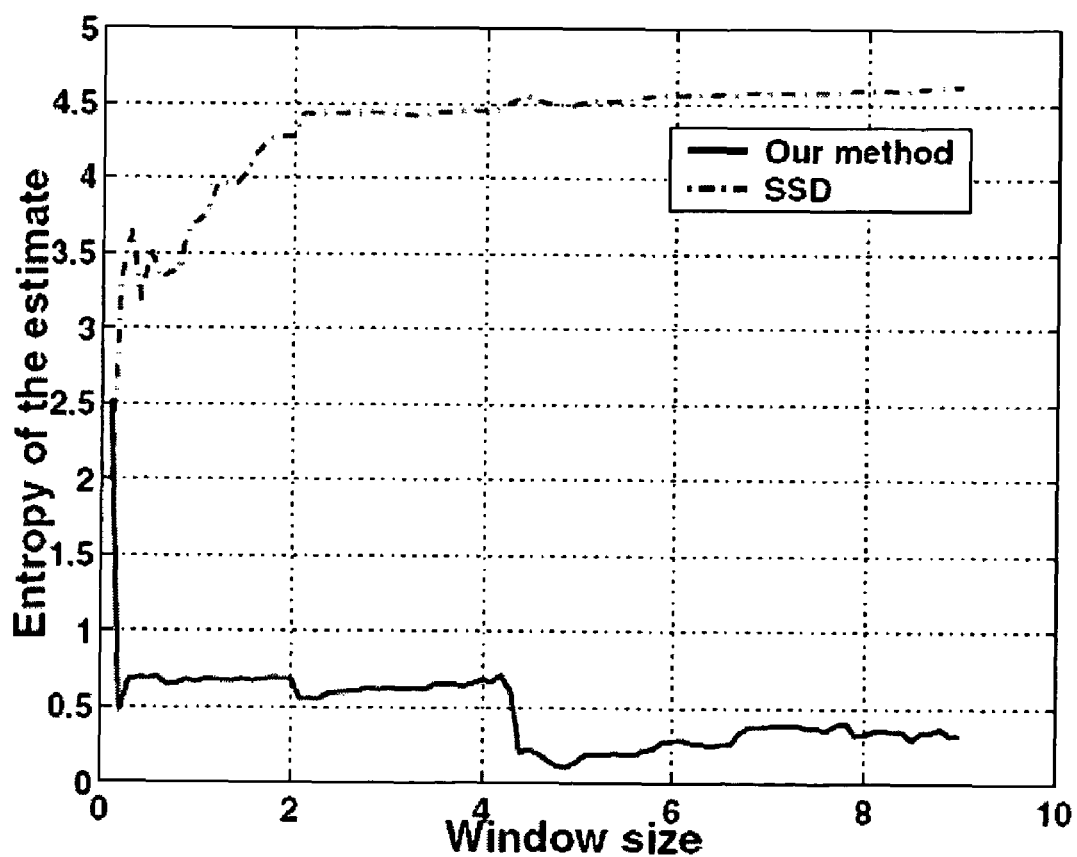
FIG. 4 provides a graph comparing entropy of different block sizes.
Figure 5:
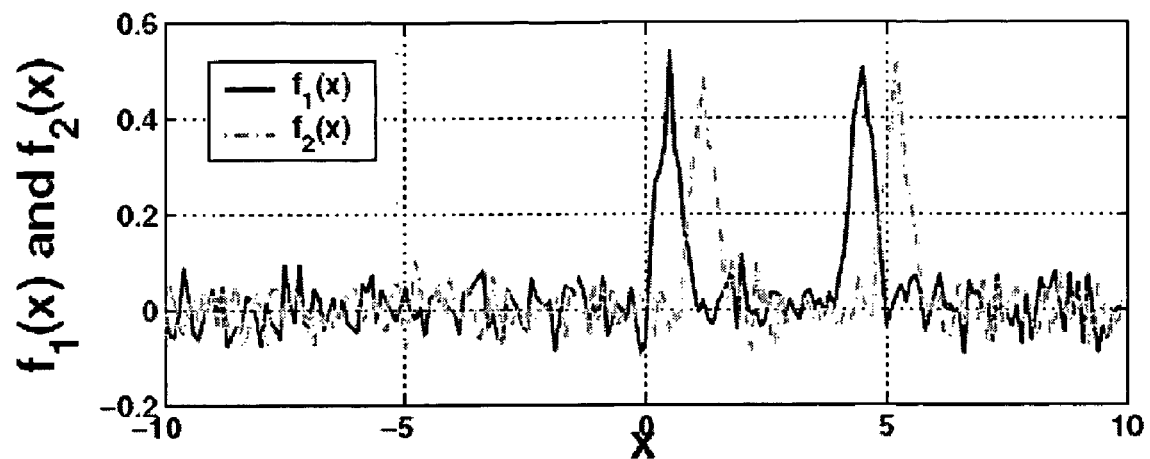
FIG. 5 provides two frames of a 1d signal.
Figure 6:
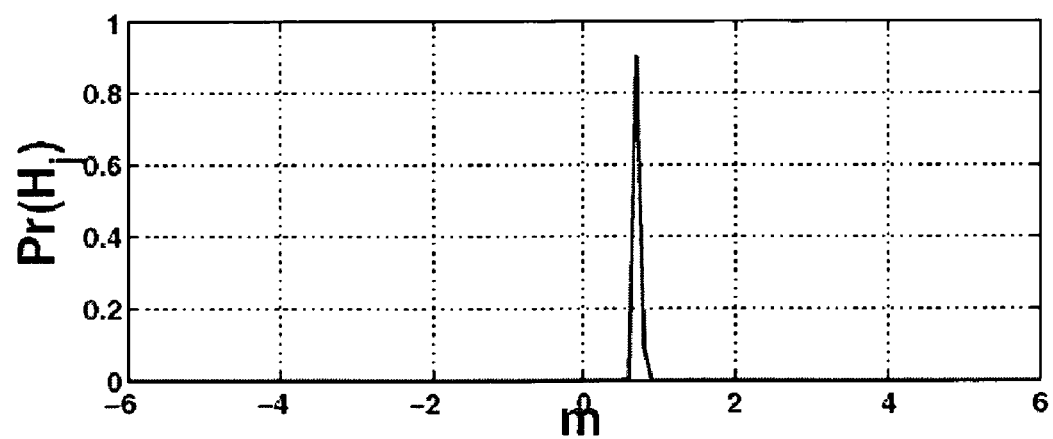
FIG. 6 provides a graph of matching probabilities.
Figure 7:
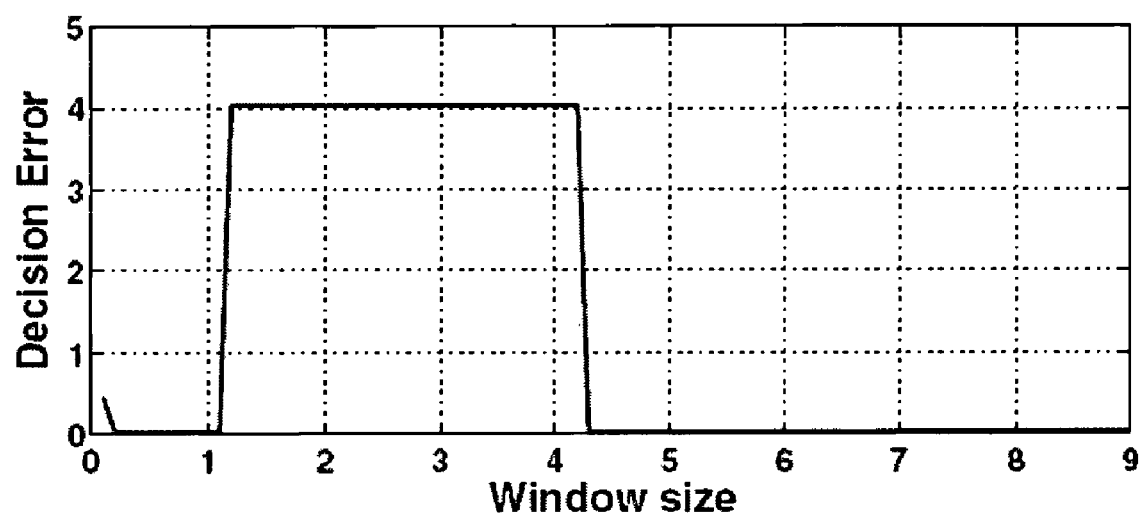
FIG. 7 provides a graph of the translation estimation error.
Figure 8:
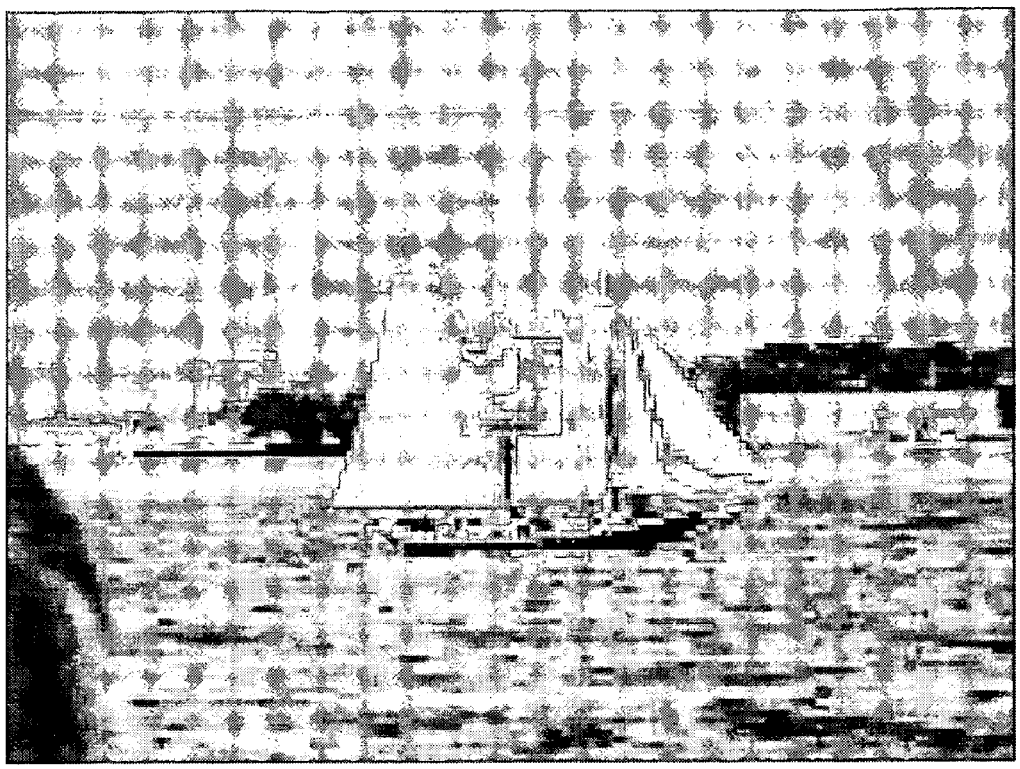
FIG. 8 provides a first frame of an image sequence.
Figure 9:
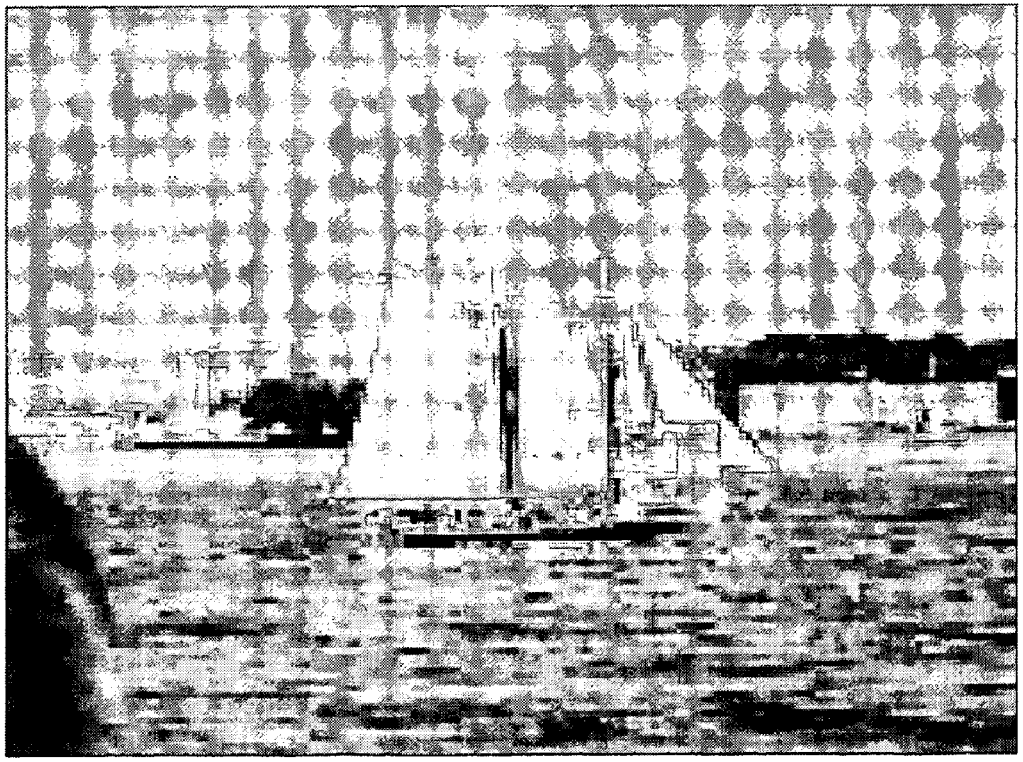
FIG. 9 provides a second frame of an image sequence.
Figure 10:
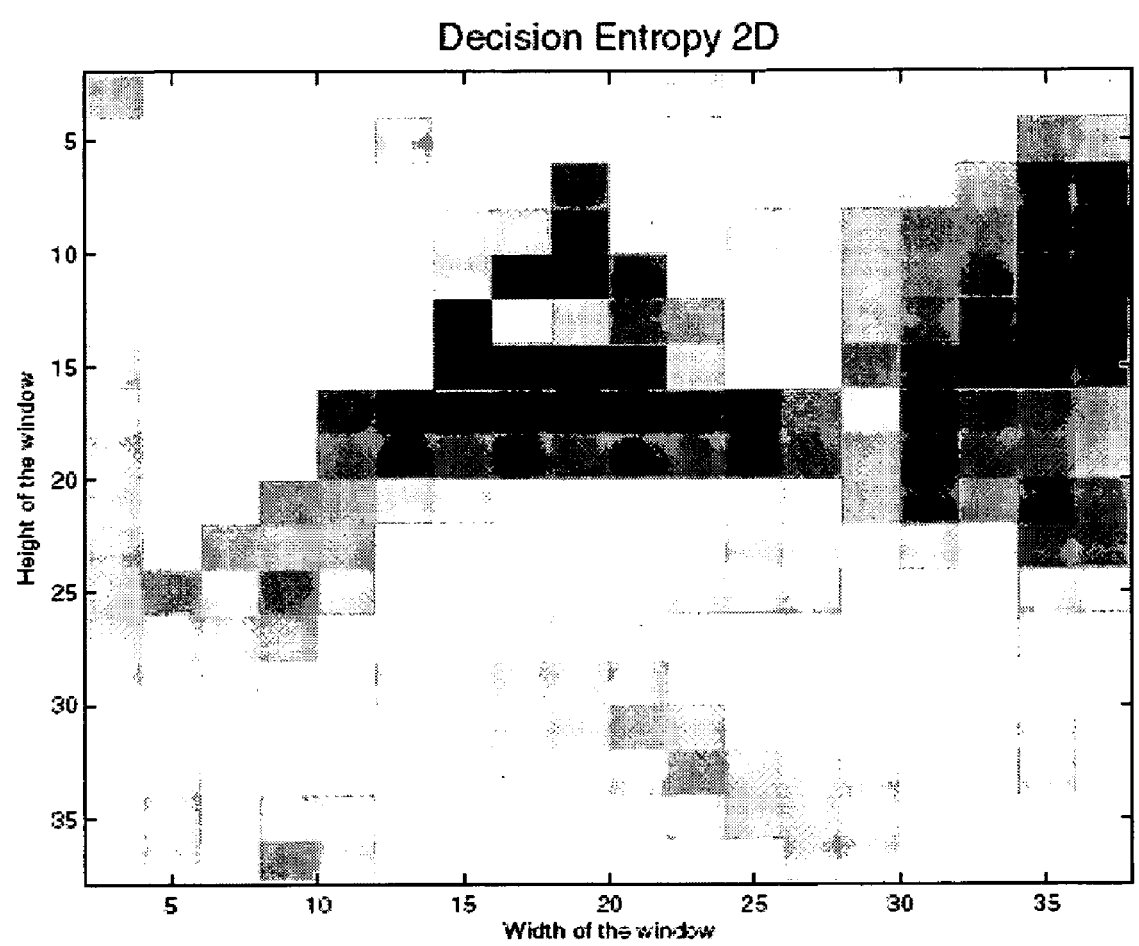
FIG. 10 provides a 2d representation of the entropy of an estimate of different window sizes.
Figure 11:
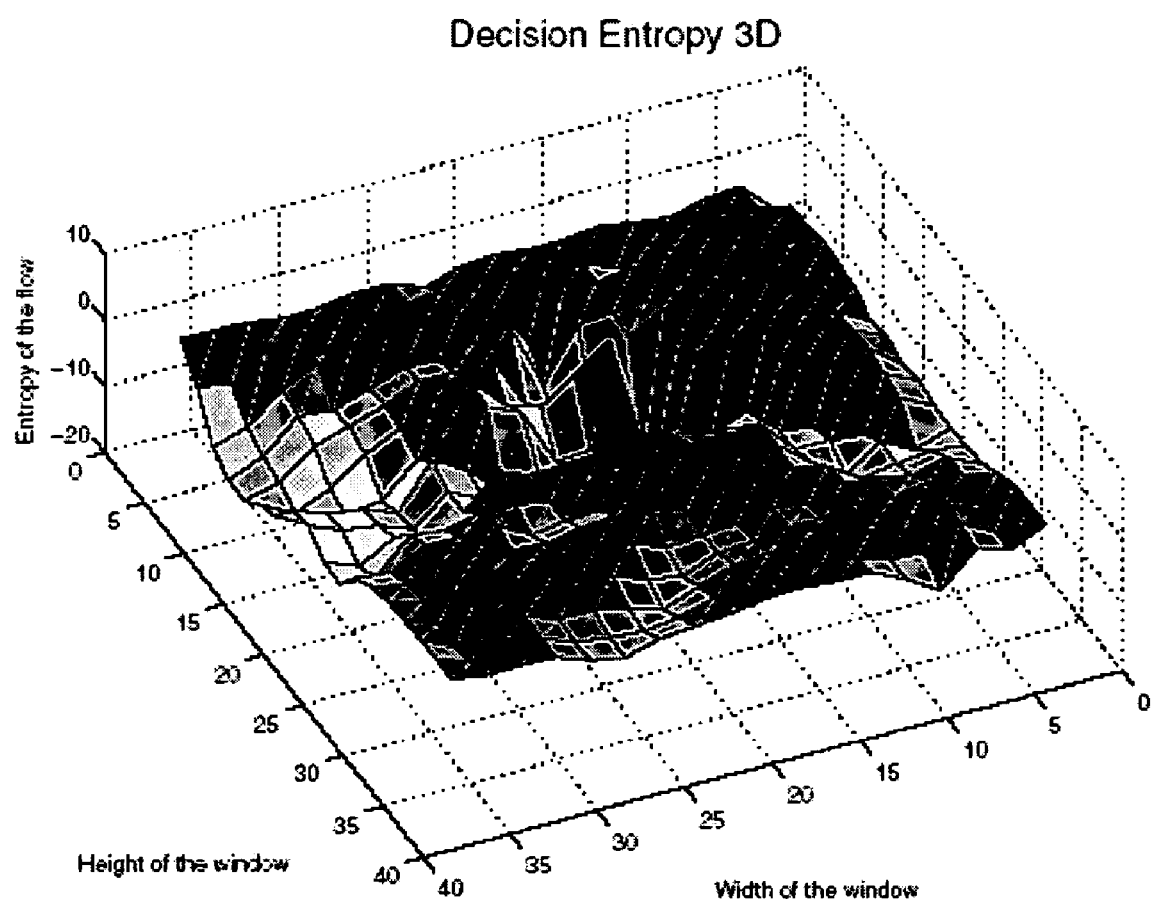
FIG. 11 provides a 3d representation of the entropy of an estimate of different window sizes.

A number of experiments were conducted to validate the approach of the present invention. FIGS. 4, 5, 6 and 7 show the matching performance evaluation and template selection for a 1d signal consisting of two pulses of width 1, apart from each other by 3 units. The two frames of the 1d signal are shown in FIG. 5. The original 1d signal translation is ⅔ unit between two frames. The translation is very precisely estimated using the template selected by the proposed framework. The matching probability is shown in FIG. 6. The original signal is contaminated by AWGN with μ=0.04. The variance is accurately estimated by frequency domain method. Since the energy in the high frequency is mainly from AWGN, the Power Spectrum Density (PSD) of the high frequency is estimated and the variance is solved using Parseval's equation. In this experiment, the templates set contains the 1d window starting at origin with width ranging from 0.1 to 9. In order to estimate the translation of the pulse, the optimal template should be the template big enough to contain all the discriminative feature of the signal and tight enough to exclude the non-discriminative feature. In this case, since the AWGN is zero mean, all the signal value that is around 0 is non-discriminative feature. The bigger the signal value, the more discriminative. In order to include all the discriminative features while excluding non-discriminative features, the optimal template should only contain the two pulses and rejects other parts of the signal beyond the pulses. Thus the optimal template should be the window just wide enough to contain the 2-pulses signal, i.e. W=1+3+1=5. FIG. 4 shows that our estimation of the block size is 4.9, which is much better than the template selected by minimizing normalized SSD. The template minimizing normalized SSD has the width $W_{SSD}=0.1$. FIG. 7 shows that for a template with width less than 4, there are matching errors. This is quite reasonable because the two pulses are similar. If the template contains only 1 pulse, a matching algorithm cannot tell which of the two pulses in the second frame corresponds to the pulse contained in the template. The big drop in the entropy of the estimate (shown in FIG. 4) for a template with width larger than 4.2 shows that the method which is one aspect of the present invention suggests to take the template with width larger than 4 to disambiguate the confusion, which is a very nice property. In this case the choice of template really affects the matching result significantly. The template selected by minimizing the entropy of the estimate is a template big enough to avoid matching error and small enough to exclude the non-discriminative feature.

Figure 12:
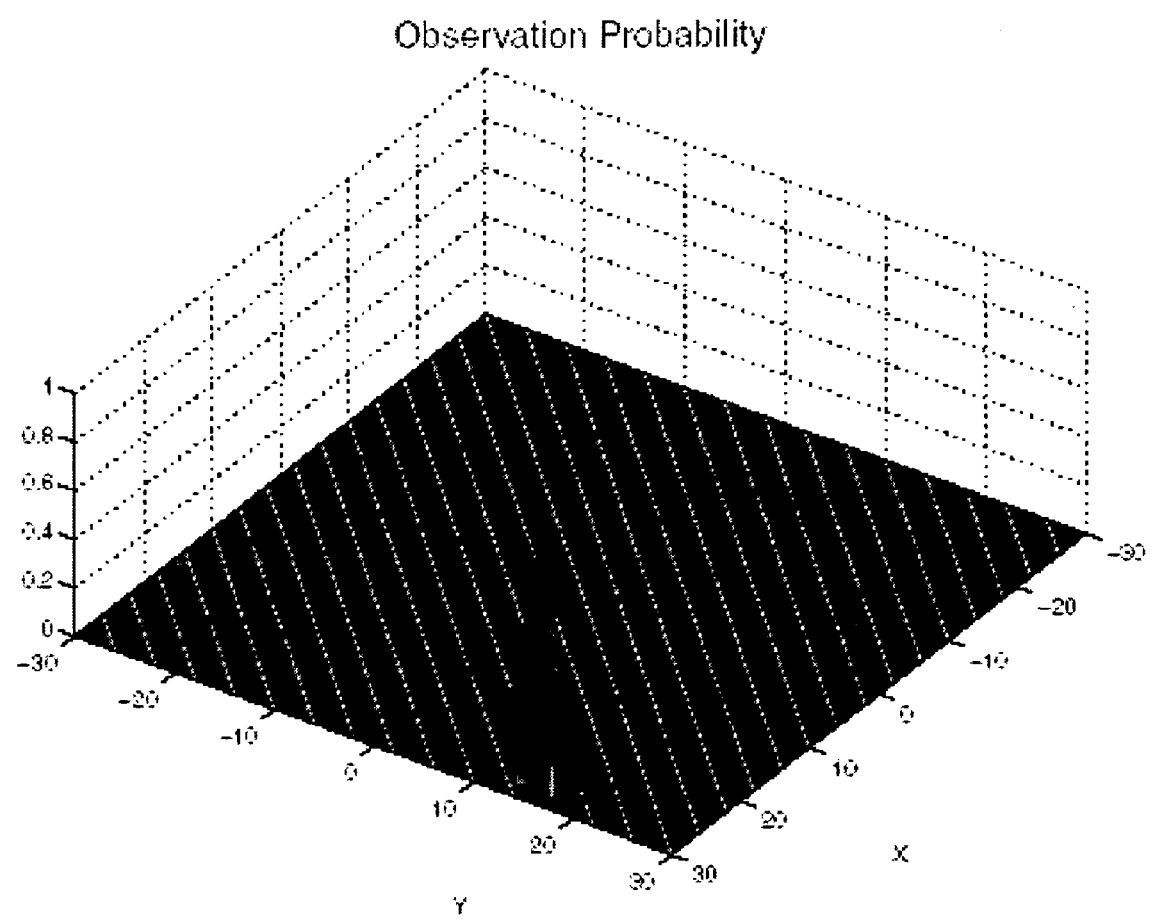
FIG. 12 provides a 3d representation of the matching probability under optimal scale.
Figure 13:
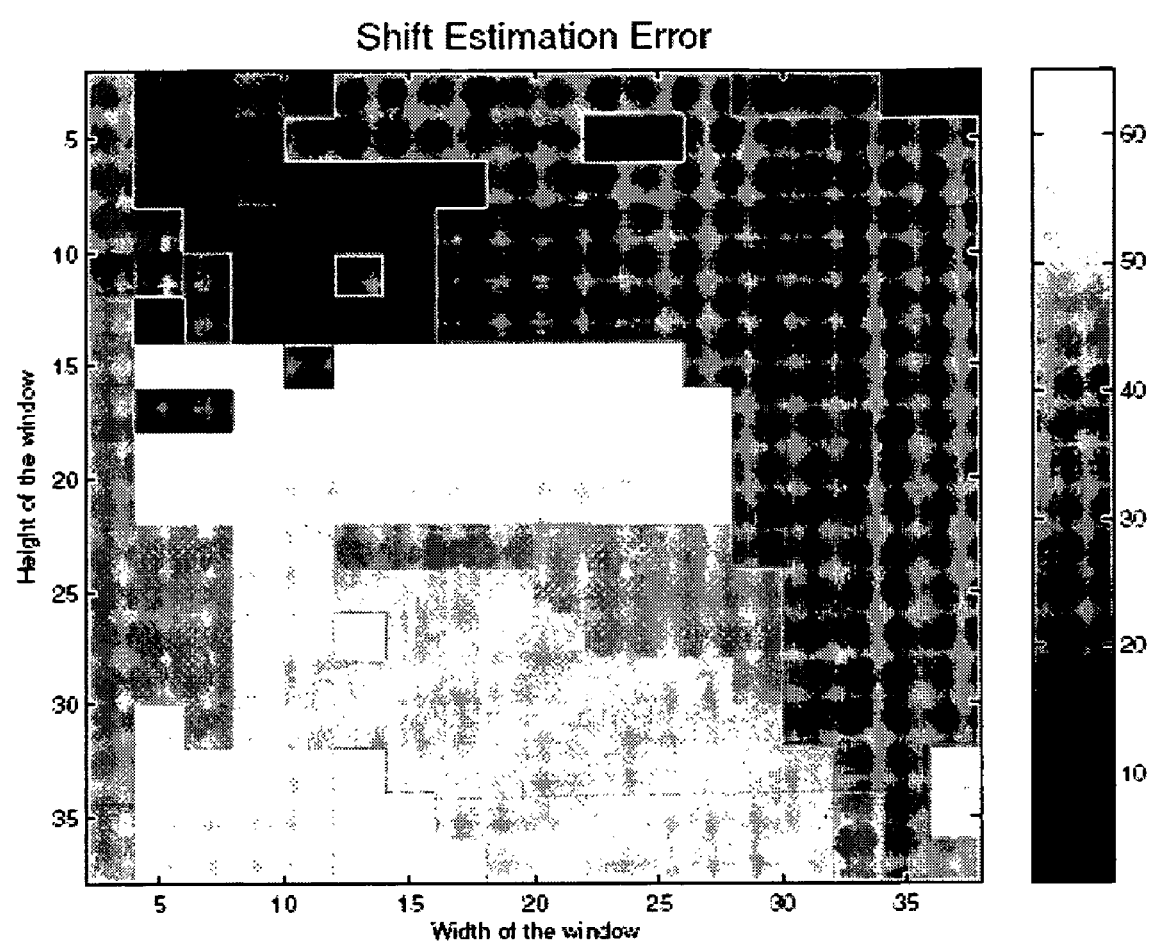
FIG. 13 provides a representation of the translation estimation error for different scales.
Figure 14:
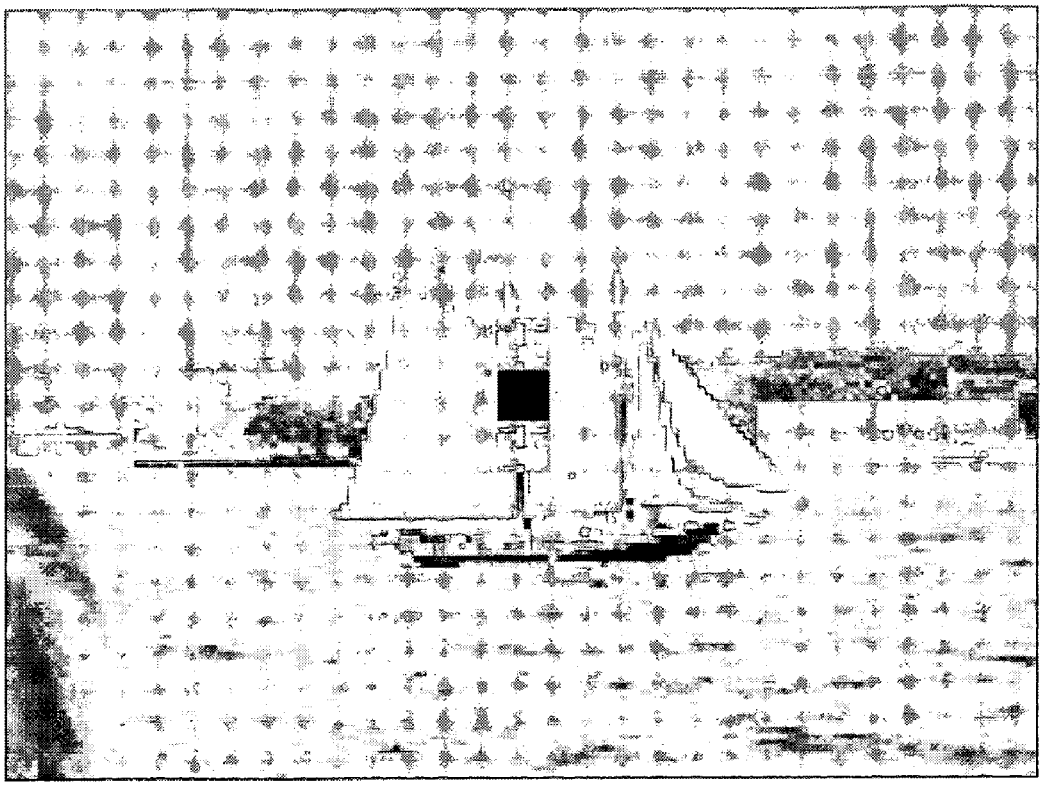
FIG. 14 provides a first frame of another image sequence.
Figure 15:
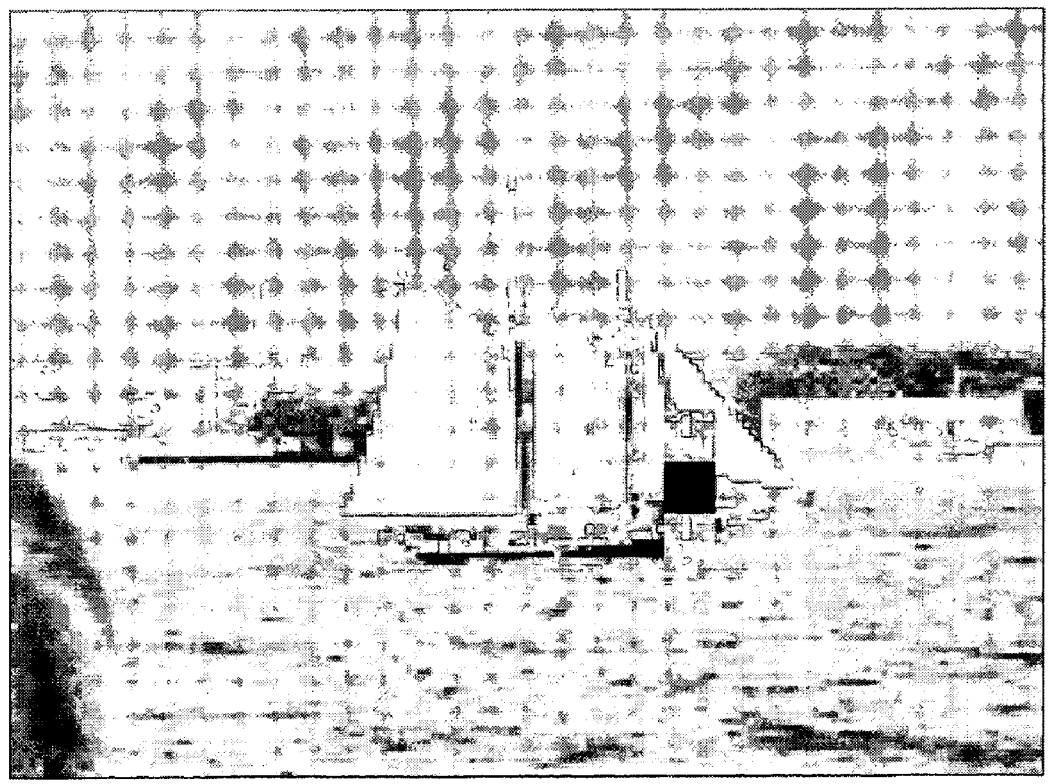
FIG. 15 provides a second frame of another image sequence.
Figure 16:
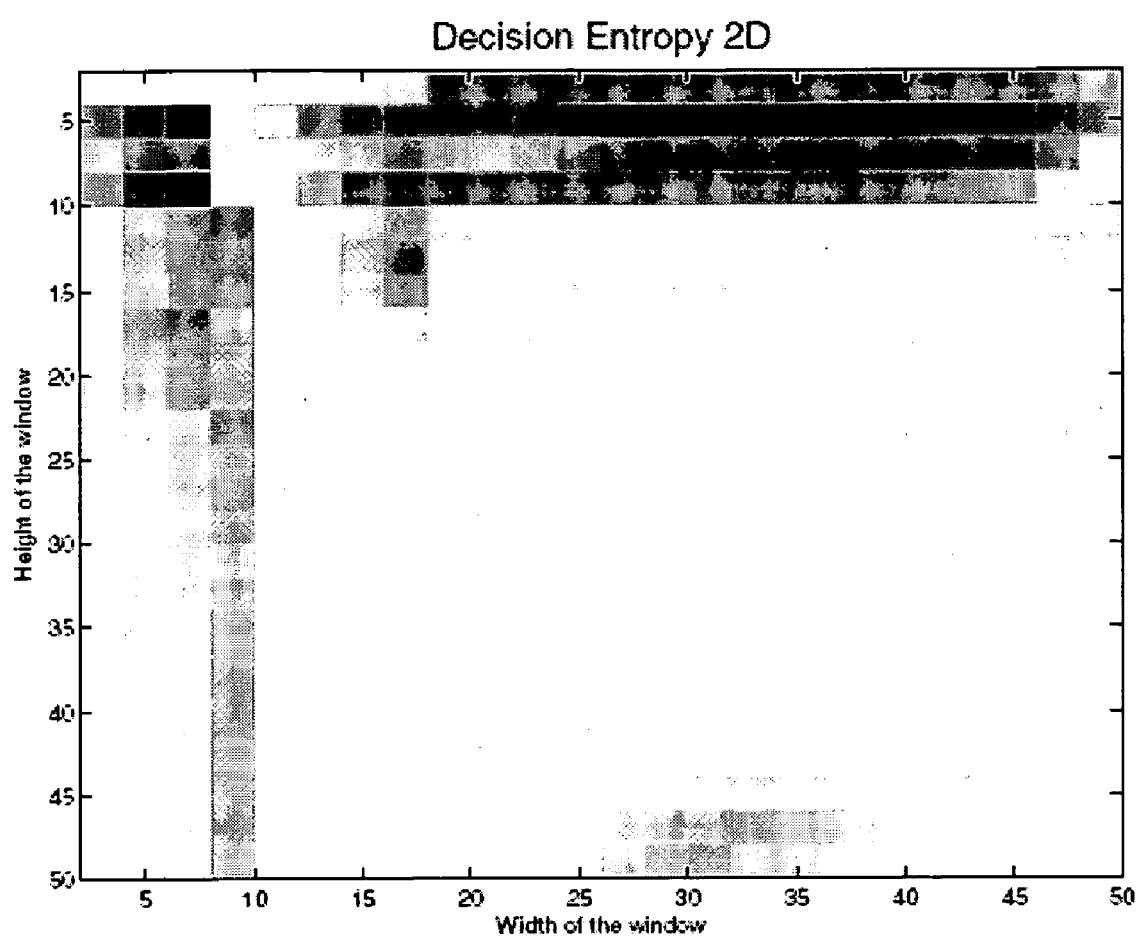
FIG. 16 provides a 2d representation of the entropy of an estimate of different window sizes.
Figure 17:
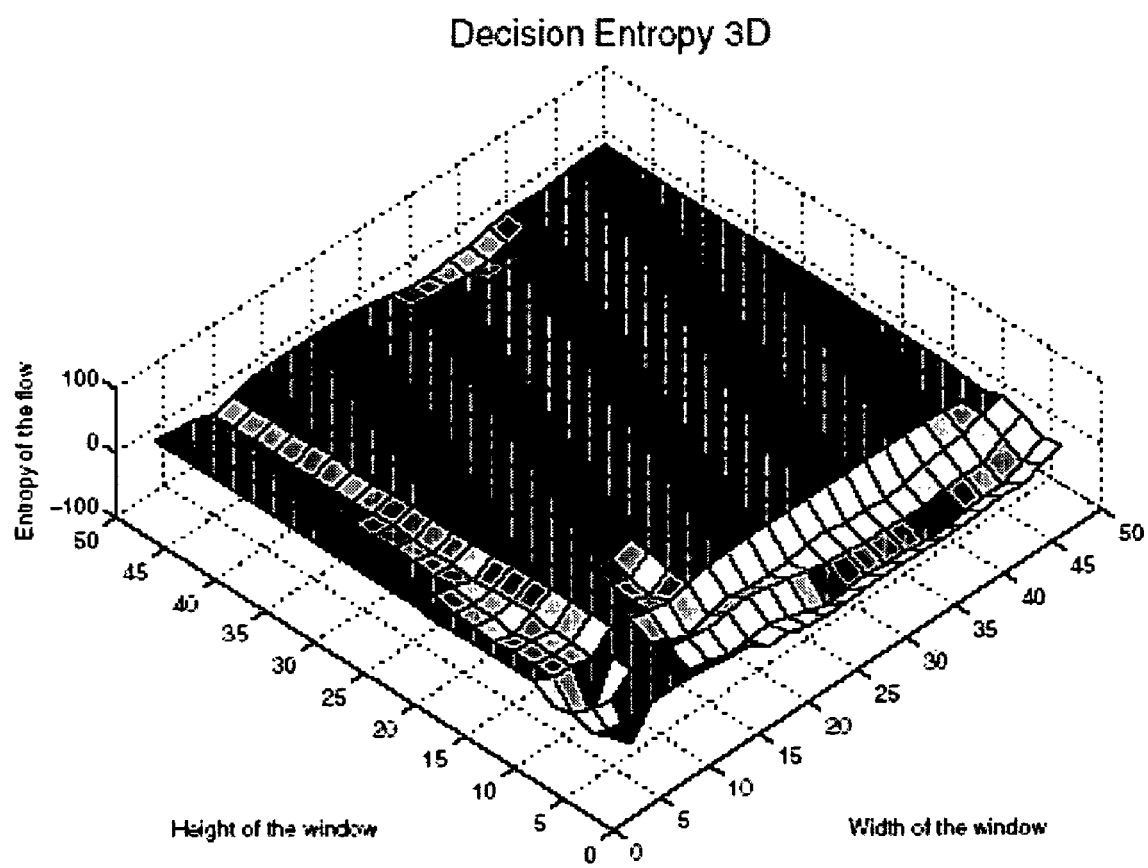
FIG. 17 provides a 3d representation of the entropy of an estimate of different window sizes.

FIGS. 8, 9, 10, 11, 12 and 13 show the performance evaluation and template selection for matching a 16×16 face patch that is inserted into the picture of a background scene. The patch is translated by (25,15) units. The variance of the assumed AWGN is estimated by a 2d Parseval's equation. The template family in this experiment is comprised of all rectangular templates that are centered in the image. In order to include all the discriminative features while exclude non-discriminative features, the optimal template should be the one that only contains the face and rejects other smooth background parts. Thus the size of the optimal template (the ground truth) should be 16×16. The entropy of the estimate shown in FIGS. 10 and 11 suggests size of the optimal template is $W_y=13$ and $W_x=15$. When the optimal template is used, the matching probability shown in FIG. 12 provides the accurate estimation of the translation: (26, 14). One should notice that the choice of the template affects the matching results significantly. FIG. 13, shows that only the template with size from 10×10 to 16×16 provides correct matching results. If a template of other sizes is used, matching errors will occur.

Figure 18:
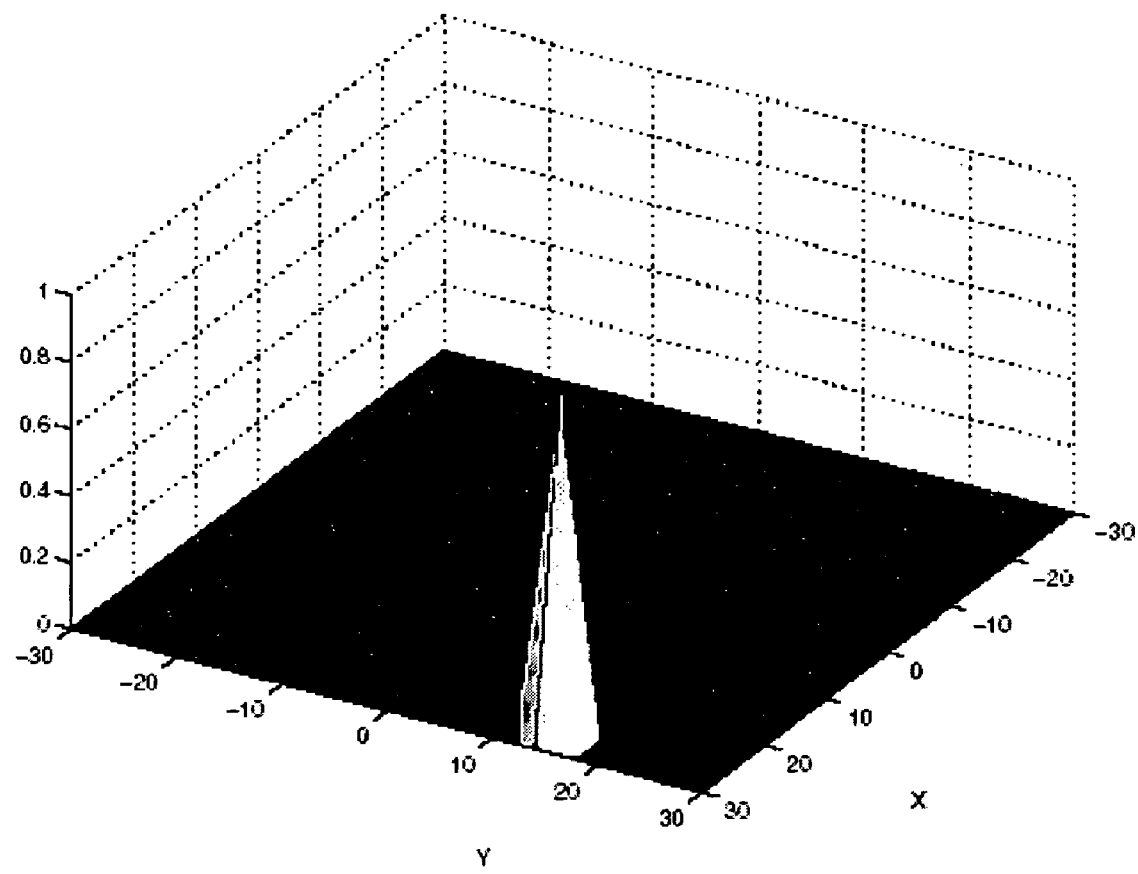
FIG. 18 provides a 3d representation of the matching probability under optimal scale.
Figure 19:
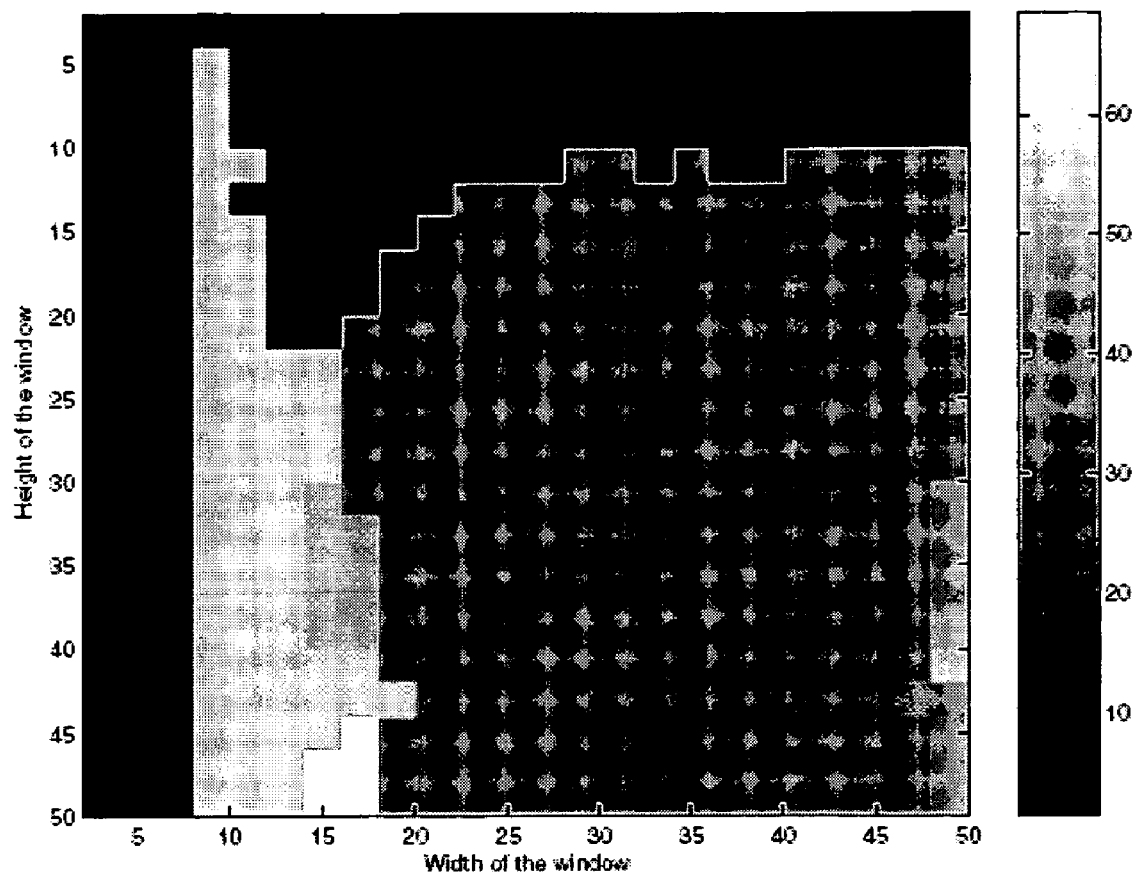
FIG. 19 provides a representation of the translation estimation error for different scales.

FIGS. 14, 15, 16, 17, 18 and 19 show the results of matching a 24×8 image patch encapsulated in the same picture. The image patch is formed by 2 heavily down sampled face patches (8×8) and an 8×8 black pattern shown in FIG. 14. The template family contains rectangular templates with various sizes. The template lies at the center of the first image. The entropy of the estimate shown in FIGS. 16 and 17 suggests a template with size $W_y=5$, 7 and $W_x=7$. This is not consistent with patch size 24×8. After carefully examining the patch, one finds that due to heavy downsampling, the 8 by 8 face patch is very smoothed and similar to background intensities, therefore the pixel in the face patches are not discriminative features anymore. So the algorithm of the present invention actually suggests that one should use the 8×8 template containing the black square, which is very discriminative for template matching. FIG. 18 shows that the suggested template of size 5×7 or 7×7 gives tiny matching error of 1 unit. FIG. 18, also shows that if the image patch of 24×8 is used as the template, there will be a big matching error. These results demonstrate that the template selected by minimizing the entropy of the estimate gives accurate matching results with least ambiguity.

Figure 20:
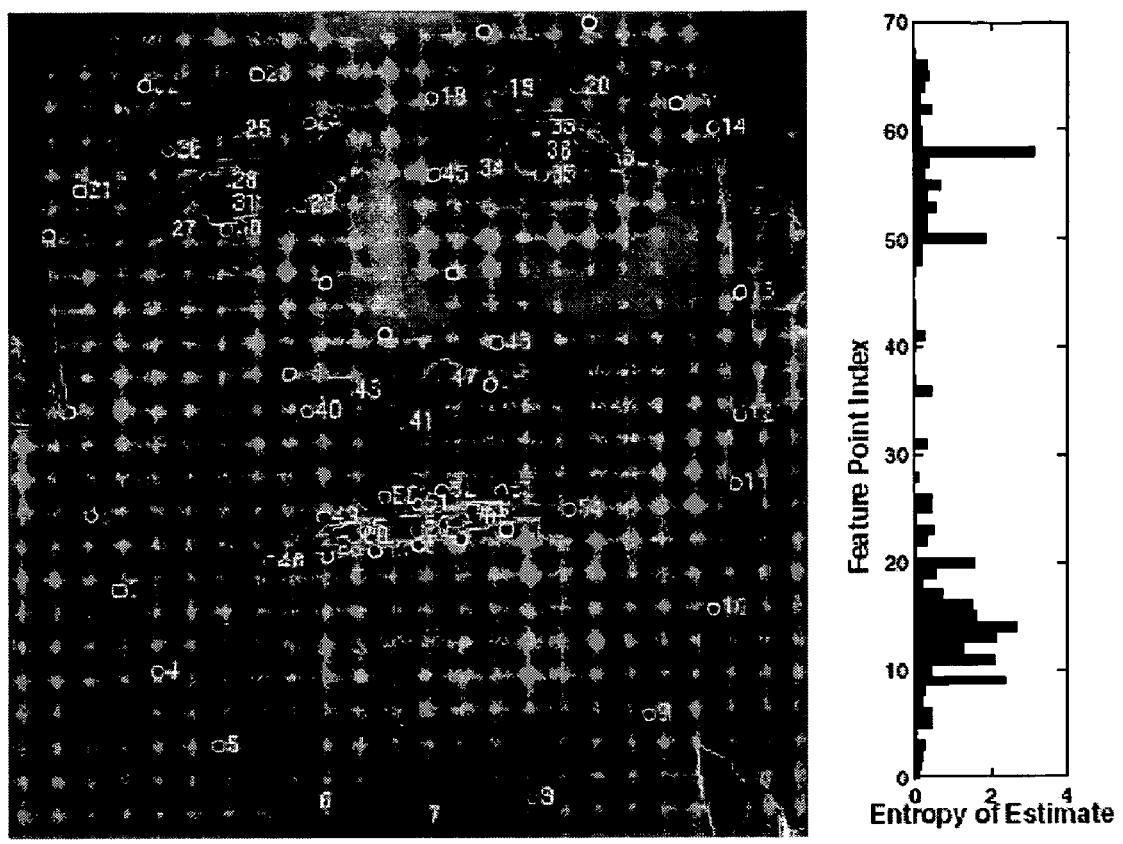
FIG. 20 provides a graphical presentation of the entropy of the estimate of indexed features in an image.
Figure 21:
FIG. 21 provides matching results in an image sequence using different templates.

FIGS. 20 and 21 show the results of matching performance evaluation and template selection by applying the framework which is one aspect of the present invention to the standard talking face video.

The video is available on-line and can be downloaded.

The talking face video consists of 5000 frames taken from a video of a person engaged in conversation. 68 points are selected as feature points on the face. For each frame, the ground truth positions of the feature points are labeled semi-automatically by AAM as described in [18] T. Cootes, G. Edwards, and C. Taylor, "Active appearance models," *IEEE Trans. on PAMI*, vol. 23, pp. 681-685, June 2001, and by human checking. As one aspect of validating the present invention the template matching results will be compared with the ground truth. The entropy of the estimate is used to evaluate the matching results for size-fixed template around the feature points. When 25×25 templates around feature points are applied, FIG. 20 shows that the facial points No. 8-No. 15. in the image have a high entropy of the estimate. That means the template matching results for these facial points are not reliable. This conclusion is verified by the video matching results. (One can check that with the supplementary video files). Due to an out-plane rotation from frame 1110 to frame 1150, the template matchings for feature point No. 8-NO. 15 in the image is unreliable and the templates drift away. The entropy of the estimate for points No. 35-No. 45 in the image is very low. These points are corresponding to eyes, eye corners and nose, which are reliably matched. These results illustrate consistency of the predictions from the analysis to real results. The images in right columns of FIG. 21 show the ground truth position of the feature points at frame 01170, 01260, 01280, 01350. The images in the middle column show the matching results using the templates with minimum entropy of the estimate around each feature point. The images in the left column show the matching results using prefixed 25×25 template around each feature point. The templates drift away after 150 frames if the prefixed template around each feature point is used. In contrast, none of the entropy-minimizing template drift away for all the feature points.

Figure 22:
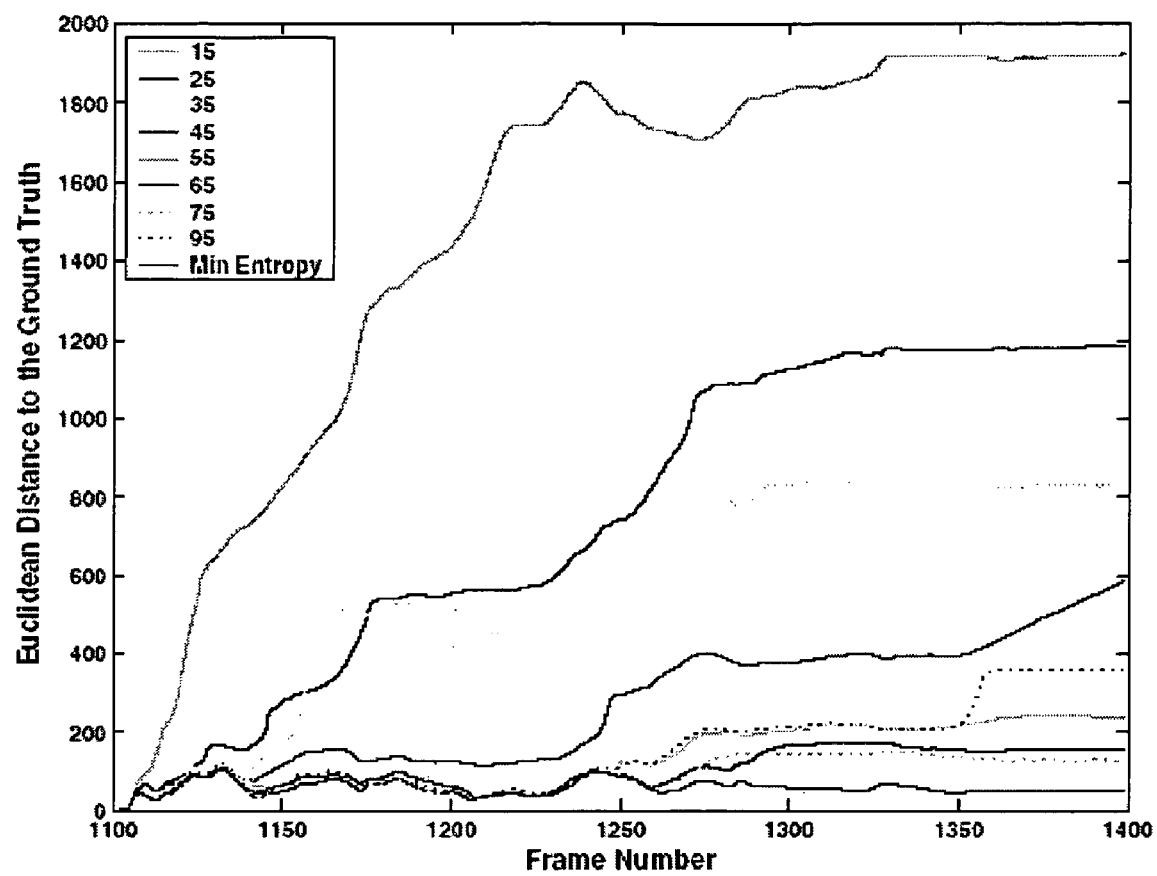
FIG. 22 provides graphs showing matching errors using different templates.

FIG. 22 shows the template matching errors (i.e. the Euclidean distance from the matched template locations to the ground truth of 68 points) for various templates. FIG. 22 substantiates the assumption that choosing the template sizes to minimize entropy of the estimate provides the best matching results. These results show the advantage of the selected approach of the probabilistic characterization framework for template selection and template matching evaluation as one aspect of the present invention.

In summary, template matching is a fundamental operator in computer vision and is widely used in feature tracking, motion estimation, image alignment, and mosaicing. Under a certain parameterized warping model, the traditional template matching algorithm estimates the geometric warp parameters that minimize the SSD between the target and a warped template. The performance of the template matching can be characterized by deriving the distribution of warp parameter estimate as a function of the ideal template, the ideal warp parameters, and a given noise or perturbation model. In this paper a discretization of the warp parameter space is assumed and the theoretical expression for the probability mass function (PMF) of the parameter estimate is derived. Because the PMF is also a function of the template size, the choice of the template or block size can be optimized by determining the template/block size that gives the estimate with minimum entropy. Experimental results illustrate the correctness of this aspect of the present invention. Feature point tracking in a face video as shown in FIGS. 20 and 21 illustrates the robustness of the selected approach of the present invention, which is further demonstrated in the graph of FIG. 22.

In conclusion the tracking of one or more objects in two or more data frames (such as consecutive video image frames) by optimizing the estimation of warping parameters may be summarized by the following steps:

Step 1. Starting with the first data frame or image frame select k landmark locations L1, L2, ..., Lk with k≧1 around which templates are constructed;

Step 2. Using the theoretical performance model for the template matcher to derive an optimal template size for each of the templates around a landmark location. (i.e. estimate: (L1,S1), (L2,S2), ..., (Lk,Sk); wherein the Sk's are the templates sizes). The size of the template is decided using the performance model of how well the template matcher will work based on: the current image data around the landmark, the noise parameter in the image, and the range of possible warps assumed between the first image and the second image.

Step 3. Applying template matching for each template with the selected optimal template size and estimating the best warp parameters that minimize the distances between the warped template and a second frame image candidate regions. Output of this step are the estimated warps W1, . . . , Wk of objects from a first frame to a second frame.

Step 4. Applying the estimated warps W1, . . . , Wk to identify new landmark locations in the second frame. When the second frame is not the last frame then: the second frame becomes the first frame and the next frame will be the second frame and the previous steps are repeated.

In this section the derivation of the expressions for the expectation, variance and covariance of d($\alpha$) as function of the observation will be provided.

$$E[d(\alpha)] = E\left[\sum_{x\in\Omega}(f(x)-f(\tilde{\alpha}\alpha^{-1}(x))^2\right]$$

$$= \sum_{x\in\Omega} E\left[((f_1(x)-\eta(x))-(f_2(\alpha^{-1}(x))-\xi(\alpha^{-1}(x))))^2\right]$$

$$= 2W\sigma^2 + \sum_{x\in\Omega}(f_1(x)-f_2(\alpha^{-1}(x)))^2$$

$$\mathrm{Var}[d(\alpha)] = E[(d(\alpha)-E(d(\alpha)))^2]$$

$$= \left[\left(-2W\sigma^2 + \sum_{x\in\Omega}(f_1(x)-\eta(x)-(f_2(\alpha^{-1}(x))+\xi(\alpha^{-1}(x)))^2 - (f_1(x)-f_2(\alpha^{-1}(x)))^2\right)\right]$$

$$= E\left[\left(-2W\sigma^2 + \sum_{x\in\Omega} -2(f_1(x)-f_2(\alpha^{-1}(x)))(\eta(x)-\xi(\alpha^{-1}(x))) + (\eta(x)-\xi(\alpha^{-1}(x)))^2\right)^2\right]$$

$$= 4W^2\sigma^4 - 8W^2\sigma^4 + E\left[\left(\sum_{x\in\Omega} 2(f_1(x)-f_2(\alpha^{-1}(x)))(\eta(x)-\xi(\alpha^{-1}(x)))\right)^2\right] +$$

$$E\left[\left(\sum_{x\in\Omega}\eta^2(x)-2\eta(x)\xi(\alpha^{-1}(x))+\xi^2(\alpha^{-1}(x))\right)^2\right]$$

$$= -4W^2\sigma^4 + 8\sigma^2\sum_{x\in\Omega}(f_1(x)-f_2(\alpha^{-1}(x)))^2 + 4W(W-1)\sigma^4 + 3W\sigma^4 + 3W\sigma^4 +$$

$$2W\sigma^4 + 4W\sigma^4$$

$$= 8W\sigma^4 + 8\sigma^2\sum_{x\in\Omega}(f_1(x)-f_2(\alpha^{-1}(x)))^2$$

The covariance will be computed for two different cases. If $\alpha=\beta$, $$\mathrm{Cov}(d(\alpha),d(\beta)) = \mathrm{Var}(d(\alpha)) = \mathrm{Var}(d(\beta)).$$

If $\alpha\neq\beta$: $\mathrm{Cov}(d(\alpha),d(\beta)) = E((d(\alpha)-E(d(\alpha)))(d(\beta)-E(d(\beta)))) =$ $$E\left[\left(-2W\sigma^2 + \sum_{x\in\Omega}(\eta(x)-\xi(\alpha^{-1}(x)))^2 - \right.\right.$$

$$2(f_1(x)-f_2(\alpha^{-1}(x)))(\eta(x)-\xi(\alpha^{-1}(x))))$$

$$\left(-2W\sigma^2 + \sum_{y\in\Omega}(\eta(y)-\xi(\beta^{-1}(y)))^2 - \right.$$

$$2(f_1(y)-f_2(\beta^{-1}(y)))(\eta(y)-\xi(\beta^{-1}(y)))\Bigg] =$$

$$4W^2\sigma^4 - 4W^2\sigma^4 - 4W^2\sigma^4 +$$

$$E\left[\sum_{x\in\Omega}\sum_{y\in\Omega}(\eta(X)-\xi(\sigma^{-1}(X)))^2(\eta(y)-\xi(\beta^{-1}(y)))^2\right] +$$

-continued $$E\left[4\sum_{x\in\Omega}\sum_{y\in\Omega}(f_1(x)-f_2(\alpha^{-1}(x)))(f_1(y)-f_2(\beta^{-1}(y)))\right.$$

$$(n(x)-\xi(\alpha^{-1}(x)))(\eta(y)-\xi(y))\Bigg] =$$

$$E\left[\sum_{x\in\Omega}\sum_{y\in\Omega}(\eta^2(x)-2\eta(x)\xi(\alpha^{-1}(x))+\xi(\alpha^{-1}(x)))\right.$$

-continued $$(\eta^2(y)-2\eta(y)\xi(\beta^{-1}(y))+\xi^2(\beta^{-1}(y)))\Bigg] +$$

$$E\left[4\sum_{x\in\Omega}\sum_{y\in\Omega}(f_1(x)-f_2(\alpha^{-1}(x)))(f_1(y)-f_2(\beta^{-1}(y)))\right.$$

$$(\eta(x)-\xi(\alpha^{-1}(x)))(\eta(y)-\xi(\beta^{-1}(y)))\Bigg] - 4W^2\sigma^4$$

for $\alpha\neq\beta$ $E\left[\sum_{x\in\Omega}\sum_{y\in\Omega}(n^2(x)n^2(y)+n^2(x)\xi^2(\beta^{-1}(y))+\right.$ $$\xi^2(\alpha^{-1}(x))\eta^2(y)+\xi^2(\alpha^{-1}(x))\xi^2(\beta^{-1}(y)))\Bigg] +$$

$$E\left[4\sum_{x\in\Omega}\sum_{y\in\Omega}(f_1(x)-f_2(\alpha^{-1}(x)))(f_1(y)-f_2(\beta^{-1}(y)))\right.$$

$$(n(x)-\xi(\alpha^{-1}(x)))(\eta(y)-\xi(\beta^{-1}(y)))\Bigg] -$$

$$4W^2\sigma^4 = w(w-1)\sigma^4 + 3w\sigma^4 + w^2\sigma^4 +$$

$$w^2\sigma^4 + |\Omega_\alpha\cap\Omega_\beta|3\sigma^4 + (w-|\Omega_\alpha\cap\Omega_\beta|)\sigma^4 +$$

-continued $$4\sigma^2 \sum_{x \in \Omega} (f_1(x) - f_2(\alpha^{-1}(x)))(f_1(x) - f_2(\beta^{-1}(x))) + 4\sigma^2$$

$$\sum_{x \in \Omega_\alpha \cap \Omega_\beta} (f_1(\alpha(x)) - f_2(x))(f_1(x)(f_1(\beta(x)) - f_2(x)) -$$

$$4W^2\sigma^4 = 2W\sigma^4 + 2|\Omega_\alpha \cap \Omega_\beta|\sigma^4 +$$

$$4\sigma^2 \sum_{x \in \Omega} (f_1(x) - f_2(\alpha^{-1}(x)))(f_1(x) - f_2(\beta^{-1}(x))) +$$

$$4\sigma^2 \sum_{x \in \Omega_\alpha \cap \Omega_\beta} (f_1(\alpha(x)) - f_2(x))(f_1(\beta(x)) - f_2(x))$$

Here $\Omega_\alpha = \{x \in R^d : \alpha^{-1}(x) \in \Omega, \alpha \in A\}$ $\Omega_\beta = \{x \in R^d : \beta^{-1}(x) \in \beta, \alpha \in A\}$ as defined earlier.

Figure 23:
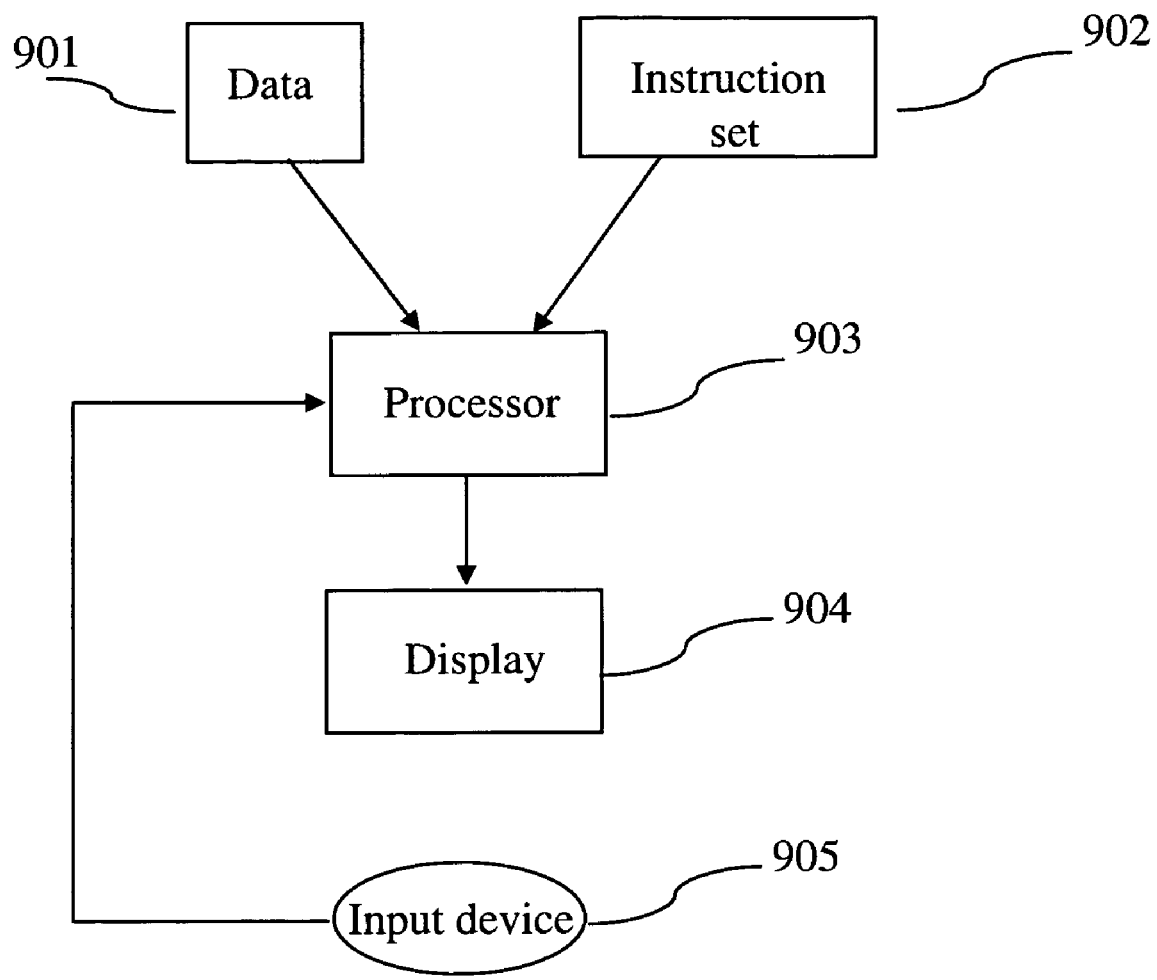
FIG. 23 illustrates a computer system that is used to perform the steps described herein in accordance with another aspect of the present invention.

FIG. 23 illustrates a computer system that can be used in accordance with one aspect of the present invention. The system is provided with data 901 representing for instance image data comprising sequential data frames. An instruction set or program 902 comprising the methods of the present invention is provided and combined with the data in a processor 903, which can process the instructions of 902 applied to the data 901 and show the resulting image on a display 904. The processor can be dedicated hardware, a CPU or any other computing device that can execute the instructions of 902. An input device 905 like a mouse, or track-ball or other input device allows a user to initiate the tracking process by selecting an initial object or neighborhood to be tracked. Consequently the system as shown in FIG. 23 provides an interactive system for image segmentation. Of course, any type of computer system can be used, although it is preferred to use a computer system having sufficient processing power. By way of example only, a stand alone PC, a multiprocessor PC, a main frame computer, a parallel processing computer or any other type of computer can be used.

The aspects of the present invention have been illustrated by image data. Also an example using signal data has been provided. The methods of the present invention apply to tracking of data neighborhoods or objects in different types of sequential data frames that may not all represent images. Application of the aspects of the present invention to non-image sequential data-frames is fully contemplated.

The following references provide background information generally related to the present invention and are hereby incorporated by reference: [1] M. J. Black and A. D. Jepson, "Eigentracking: Robust matching and tracking of articulated objects using a view-based representation," IJCV, vol. 26, pp. 63-84, 1998; [2] A. Jepson, D. Fleet, and T. El-Maraghi, "Robust online appearance models for visual tracking," IEEE Trans. on PAMI, vol. 25, pp. 1296-1311, October 2003; [3] H. Tao and T. Huang, "Explanation-based facial motion tracking using a piecewise Bezier volume deformation model," in CVPR, pp. 611-617, 1999; [4] H. Musmann, P. Pirsch, and H. J. Grallert, "Advances in picture coding," Proc. IEEE, vol. 73, pp. 523-548, April 1985; [5] J. R. Bergen, P. Anandan, K. J. Hanna, and R. Hingorani, "Hierarchical model-based motion estimation," in ECCV, pp. 237-252, Springer-Verlag, 1992; [6] B. Lucas and T. Kanade, "An iterative image registration technique with an application to stereo vision," IJCAI, pp. 6779, 1981; [7] C. Tomasi and T. Kanade, "Shape and motion from image streams under orthography: a factorization method," IJCV, vol. 9, no. 2, pp. 137-154, 1992; [8] J. P. Costeira and T. Kanade, "A multibody factorization method for independently moving objects," IJCV, vol. 29, pp. 159-179, 1998; [9] D. Comaniciu, X. Zhou, and A. Krishnan, "Robust real-time myocardial border tracking for echocardiography: an information fusion approach," IEEE Trans. on Medical Imaging, pp. 849-860, 2004; [10] H.-Y. Shum and R. Szeliski, "Construction and refinement of panoramic mosaics with global and local alignment," in JCCV, p. 953, IEEE Computer Society, 1998; [11] J. Shi and C. Tomasi, "Good features to track," Proc. CVPR, pp. 593-600, 1994; [12] T. Kaneko and 0. Hori, "Feature selection for reliable tracking using template matching," in CVPRO3, pp. 796-802, 2003; [13] C. Fermuller, D. Shulman, and Y. Aloimonos, "The statistics of optical flow," CVIU, vol. 82, pp. 1-32, April 2001; [14] P. Aguiar and J. Moura, "Image motion estimation: Convergence and error analysis," in JCIPO, pp. 11:937-940, 2001; [15] N. Johnson, S. Kotz, and N. Balakrishnan, Continuous Univariate Distributions, vol. II. New York, USA: John Wiley & Sons, 1995; [16] N. Johnson and S. Kotz, Distributions in statistics: Continuous Multivariate Distributions. New York, USA: John Wiley & Sons, 1972; [17] T. Mitchell, Machine Learning. McGraw Hill, 1997; [18] T. Cootes, G. Edwards, and C. Taylor, "Active appearance models," IEEE Trans. on PAMI, vol. 23, pp. 681-685, June 2001; [19] F. June and M. Dhome, "Hyperplane approximation for template matching," PAMI, vol. 24, pp. 996-1000, July 2002; [20] V. Ramesh and R. M. Haralick, "A methodology for automatic selection of iu algorithm tuning parameters:" in DARPA Image Understanding Workshop, pp. 663-665, 1994.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method for tracking a data object in a plurality of consecutive images by evaluating a first image and a sequential second image comprising the steps:
    a) constructing from the first image a template candidate region containing a landmark image feature;
    b) for the template candidate region, deriving by a processor from the first image an optimally sized template by minimizing an entropy of a predictive probability distribution of a warp estimate that is a function of a template size, image data of the first image, and a prior probability distribution over a plurality of warp parameters;
    d) identifying a second landmark in the second image by template matching using an estimated warp parameter;
    e) assigning the second image as the first image and assigning a third image sequential to the second image as the second image; and
    g) repeating steps a) to e) until the plurality of consecutive images has been evaluated.

2. The method of claim 1, wherein the optimal size of a template is determined by evaluating a theoretical performance model for template matching.

3. The method of claim 2, wherein the theoretical performance model is a statistical model.

4. The method of claim 2, wherein the theoretical performance model is a predictive model.

5. The method of claim 2, wherein the theoretical performance model is a statistical and a predictive model.

6. The method of claim 2, wherein the theoretical performance model is a function of image data around a landmark.

7. The method of claim 2, wherein the theoretical performance model is a function of a noise parameter in the first image.

8. The method of claim 2, wherein the theoretical performance model is a function of a range of assumed warps between the first image and the second image.

9. The method of claim 2, wherein the theoretical performance model is described by a predictive probability distribution of an estimated warp parameter.

10. The method of claim 9, wherein a predictive probability distribution computation can be approximated as $$Pr[\alpha^{(j)}] \approx Q[\alpha^{(j)}] = K \prod_{\substack{i=1 \\ i \neq j}}^{M} Pr[Y_{ij} < 0]$$

$$= K \prod_{\substack{i=1 \\ i \neq j}}^{M} \Phi\left(\frac{-E[Y_{ij}]}{\sqrt{\text{Var}[Y_{ij}]}}\right).$$

11. The method of claim 9, wherein the predictive probability distribution is depending on the size of the template.

12. The method of claim 11, wherein the size of the template is optimal when the entropy of the predictive probability distribution is minimal.

13. A system to process an image from image data, including:
   a processor;
   application software operable on the processor for tracking a data object in a plurality of consecutive images by evaluating a first image and a sequential second image comprising the steps:
   a) constructing from the first image a template candidate region containing a landmark image feature;
   b) for the template candidate region, deriving from the first image an optimally sized template by minimizing an entropy of a predictive probability distribution of a warp estimate that is a function of a template size, image data of the first image, and a prior probability distribution over one or more warp parameters;
   c)
   d) identifying a second landmark in the second image by template matching using an estimated warp parameter;
   e) assigning the second image as the first image and assigning a third image sequential to the second image as the second image; and
   g) repeating steps a) to e) until the plurality of consecutive images has been evaluated.

14. The system of claim 13, wherein the optimal size of a template is determined by evaluating a theoretical performance model for template matching.

15. The system of claim 14, wherein the theoretical performance model is a statistical model.

16. The system of claim 14, wherein the theoretical performance model is a predictive model.

17. The system of claim 14, wherein the theoretical performance model is a statistical and a predictive model.

18. The system of claim 14, wherein the theoretical performance model is a function of image data around a landmark.

19. The system of claim 14, wherein the theoretical performance model is a function of a noise parameter in the first image.

20. A method for tracking a data object in a plurality of consecutive images by evaluating a first image and a sequential second image comprising the steps:
   a) constructing a plurality of template candidate regions (L1, L2, . . . Lk) from landmark locations;
   b) for each of the plurality of template candidate regions, deriving by a processor an optimally sized template (L1, S1), (L2, S2), . . . (Lk, Sk) using a performance model;
   c) estimating warp parameters (W1, W2, . . . Wk) that minimize a measure of distance between a warped template of optimal size and a candidate region in the second image;
   d) identifying second landmarks in the second image by using the estimated warp parameters;
   e) assigning the second image as the first image and assigning a third image sequential to the second image as the second image;
   f) selecting landmark locations in the first image;
   g) repeating steps a) to f) until all sequential images have been evaluated; and
   wherein the optimal size of a template is determined by evaluating a theoretical performance model for template matching that is described by a predictive probability distribution of an estimated warp parameter and wherein a predictive probability distribution computation can be approximated as $$Pr[\alpha^{(j)}] \approx Q[\alpha^{(j)}] = K \prod_{\substack{i=1 \\ i \neq j}}^{M} Pr[Y_{ij} < 0]$$

$$= K \prod_{\substack{i=1 \\ i \neq j}}^{M} \Phi\left(\frac{-E[Y_{ij}]}{\sqrt{Var[Y_{ij}]}}\right).$$

* * * * *